US005594918A

United States Patent [19]
Knowles et al.

[11] Patent Number: 5,594,918
[45] Date of Patent: Jan. 14, 1997

[54] PARALLEL COMPUTER SYSTEM PROVIDING MULTI-PORTED INTELLIGENT MEMORY

[75] Inventors: Billy J. Knowles, Kingston; Clive A. Collins, Poughkeepsie; Christine M. Desnoyers, Pine Bush; Donald G. Grice, Kingston; David B. Rolfe, West Hurley, all of N.Y.

[73] Assignee: International Business Machines Corporation, Armonk, N.Y.

[21] Appl. No.: 412,354

[22] Filed: Mar. 28, 1995

Related U.S. Application Data

[63] Continuation of Ser. No. 986,175, Dec. 4, 1992, abandoned, and a continuation-in-part of Ser. No. 888,684, May 22, 1992, abandoned, and a continuation-in-part of Ser. No. 887,630, May 22, 1992, and a continuation-in-part of Ser. No. 887,258, May 22, 1992, abandoned, and a continuation-in-part of Ser. No. 887,259, May 22, 1992, abandoned, and a continuation-in-part of Ser. No. 887,508, May 22, 1992, abandoned, which is a continuation-in-part of Ser. No. 698,866, May 13, 1991, Pat. No. 5,313,645.

[51] Int. Cl.[6] .......................... G06F 13/28; G06F 13/376
[52] U.S. Cl. ................. 395/800; 395/182.1; 395/200.13
[58] Field of Search ..................... 395/290, 375, 395/182.09, 182.04, 445, 448, 800, 182.1, 775, 200.08, 200.15; 364/DIG. 1, DIG. 2

[56] References Cited

U.S. PATENT DOCUMENTS

| 3,537,074 | 12/1967 | Stokes et al. ........................ 340/172 |
| 3,544,973 | 12/1970 | Borck et al. ......................... 340/172.5 |

(List continued on next page.)

FOREIGN PATENT DOCUMENTS

| 0132926 | 2/1985 | European Pat. Off. . |
| 0208497 | 6/1986 | European Pat. Off. . |
| 208457A2 | 6/1986 | European Pat. Off. . |
| 340668A2 | 4/1989 | European Pat. Off. . |
| 428327A1 | 11/1990 | European Pat. Off. . |
| 429733A2 | 6/1991 | European Pat. Off. . |
| 0429733 | 6/1991 | European Pat. Off. . |
| 460599A3 | 12/1991 | European Pat. Off. . |
| 485690A2 | 5/1992 | European Pat. Off. . |
| 493876A2 | 7/1992 | European Pat. Off. . |
| 2223867 | 4/1990 | United Kingdom . |
| 89/09967 | 4/1988 | WIPO . |
| 92/06436 | 4/1992 | WIPO . |

OTHER PUBLICATIONS

"Transputer Architecture", Transputer Databook; 1st edition, 1989 Chapter 1, pp. 1–22, inmos.

(List continued on next page.)

*Primary Examiner*—Daniel H. Pan
*Attorney, Agent, or Firm*—Lynn L. Augspurger; Andrew M. Riddles

[57] ABSTRACT

A parallel computer system providing multi-ported intelligent memory is formed of a plurality of nodes or cells interconnected to provide a shared memory with processors of the network and their memory providing the network routing and shared memory. Each of the nodes provides a functional unit with a processor, shared memory, and communication interface. K zipper ports in addition provide a switching function to interconnect the distributed memory and processors providing the shared memory. The resulting multi-ported shared intelligent memory switch can be used to connect (switch) a variety of computer system elements (CSEs) including computers and direct access storage devices (DASDs). The multi-ported intelligent memory shared memory organized into a collection of cells or nodes and is called the hedgehog. Each node comprises a finite computer memory, a processing unit, and communication interface and at least K of the nodes of the device have a zipper port. The computing system element combines the characteristics of a switch with those of a shared memory. In addition, objects in the shared memory can change state without the intervention of computing system elements (CSEs) that are interconnected to the device (CSE and port) which is a hedgehog switch. A zipper and ISA architecture for the chip are described for implementation of the zipper node of the shared memory device.

16 Claims, 17 Drawing Sheets

☐ = COMPUTING SYSTEM ELEMENT
● = ZIPPER PORT
▫ = NETWORK NODE

U.S. PATENT DOCUMENTS

| | | | |
|---|---|---|---|
| 3,970,993 | 7/1976 | Finnila | 364/DIG. 1 |
| 4,101,960 | 7/1978 | Stokes et al. | 364/DIG. 1 |
| 4,107,773 | 8/1978 | Gilbreath et al. | 395/775 |
| 4,270,170 | 5/1981 | Reddaway | 364/DIG. 1 |
| 4,314,349 | 2/1982 | Batcher | 364/716 |
| 4,338,675 | 7/1982 | Palmer et al. | 364/748 |
| 4,380,046 | 4/1983 | Fung | 364/DIG. 1 |
| 4,394,726 | 7/1983 | Kohl | 395/550 |
| 4,412,303 | 10/1983 | Barnes et al. | 395/250 |
| 4,435,758 | 3/1984 | Lorie et al. | 364/DIG. 1 |
| 4,467,422 | 8/1984 | Hunt | 364/DIG. 1 |
| 4,468,727 | 8/1984 | Carrison | 364/DIG. 1 |
| 4,498,133 | 2/1985 | Bolton et al. | 395/200.15 |
| 4,523,273 | 6/1985 | Adams, III et al. | 364/DIG. 1 |
| 4,598,400 | 7/1986 | Hillis | 370/60 |
| 4,604,695 | 8/1986 | Widen et al. | 395/421.07 |
| 4,621,339 | 11/1986 | Wagner et al. | 364/DIG. 2 |
| 4,622,650 | 11/1986 | Kulisch | 364/748 |
| 4,706,191 | 11/1987 | Hamstra et al. | 395/250 |
| 4,720,780 | 1/1988 | Dolecek | 364/DIG. 1 |
| 4,736,291 | 4/1988 | Jennings et al. | 364/DIG. 1 |
| 4,739,474 | 4/1988 | Holsztynski | 395/DIG. 1 |
| 4,739,476 | 4/1988 | Fiduccia | 364/DIG. 1 |
| 4,748,585 | 5/1988 | Chiarulli | 395/775 |
| 4,763,321 | 8/1988 | Calvignac et al. | 370/29 |
| 4,780,873 | 10/1988 | Mattheyses | 370/94.1 |
| 4,783,738 | 11/1988 | Li et al. | 395/375 |
| 4,783,782 | 11/1988 | Morton | 395/182.08 |
| 4,805,091 | 2/1989 | Thiel et al. | 364/DIG. 1 |
| 4,809,159 | 2/1989 | Sowa | 364/DIG. 1 |
| 4,809,169 | 2/1989 | Sfarti et al. | 364/DIG. 1 |
| 4,809,347 | 2/1989 | Nash et al. | 382/240 |
| 4,814,980 | 3/1989 | Peterson et al. | 395/200.2 |
| 4,825,359 | 4/1989 | Ohkami et al. | 364/DIG. 1 |
| 4,831,519 | 5/1989 | Morton | 395/307 |
| 4,835,729 | 5/1989 | Morton | 364/DIG. 1 |
| 4,841,476 | 6/1989 | Mitchell et al. | 395/500 |
| 4,847,755 | 7/1989 | Morrison et al. | 364/DIG. 1 |
| 4,849,882 | 7/1989 | Aoyama et al. | 364/DIG. 1 |
| 4,852,048 | 7/1989 | Morton | 364/DIG. 1 |
| 4,855,903 | 8/1989 | Carleton et al. | 364/200.05 |
| 4,858,110 | 8/1989 | Miyata | 395/550 |
| 4,860,201 | 8/1989 | Stolfo et al. | 364/DIG. 1 |
| 4,872,133 | 10/1989 | Leeland | 364/748 |
| 4,873,626 | 10/1989 | Gifford | 364/DIG. 1 |
| 4,891,787 | 1/1990 | Gifford | 395/375 |
| 4,896,265 | 1/1990 | Fiduccia et al. | 395/650 |
| 4,901,224 | 2/1990 | Ewert | 395/250 |
| 4,903,260 | 2/1990 | Boettle et al. | 370/60 |
| 4,905,143 | 2/1990 | Takahashi et al. | 364/DIG. 1 |
| 4,907,148 | 3/1990 | Morton | 364/DIG. 1 |
| 4,910,665 | 3/1990 | Mattheyses et al. | 364/DIG. 1 |
| 4,916,652 | 4/1990 | Schwarz | 364/DIG. 1 |
| 4,916,657 | 4/1990 | Morton | 364/DIG. 2 |
| 4,920,484 | 4/1990 | Ranade | 395/200.17 |
| 4,922,408 | 5/1990 | Davis et al. | 395/200.21 |
| 4,925,311 | 5/1990 | Neches et al. | 395/650 |
| 4,933,846 | 6/1990 | Humphrey et al. | 395/325 |
| 4,933,895 | 6/1990 | Grinberg et al. | 364/748 |
| 4,942,516 | 7/1990 | Hyatt | 364/DIG. 1 |
| 4,942,517 | 7/1990 | Cok | 364/DIG. 1 |
| 4,943,912 | 7/1990 | Aoyma et al. | 395/650 |
| 4,956,772 | 9/1990 | Neches | 395/650 |
| 4,958,273 | 9/1990 | Anderson et al. | 395/182.08 |
| 4,964,032 | 10/1990 | Smith | 364/DIG. 1 |
| 4,967,340 | 10/1990 | Dawes | 364/DIG. 1 |
| 4,975,834 | 12/1990 | Xu et al. | 395/550 |
| 4,985,832 | 1/1991 | Grondalski | 364/DIG. 1 |
| 4,992,926 | 2/1991 | Janke et al. | 395/200.06 |
| 4,992,933 | 2/1991 | Taylor | 364/DIG. 1 |
| 5,005,120 | 4/1991 | Ruetz | 364/DIG. 1 |
| 5,006,978 | 4/1991 | Neches | 395/650 |
| 5,008,815 | 4/1991 | Hillis | 364/DIG. 1 |
| 5,008,882 | 4/1991 | Peterson et al. | 370/94.3 |
| 5,010,477 | 4/1991 | Omoda et al. | 364/DIG. 1 |
| 5,014,189 | 5/1991 | Tamitani | 364/200 |
| 5,016,163 | 5/1991 | Jesshope et al. | 395/311 |
| 5,020,059 | 5/1991 | Gorin et al. | 395/182.01 |
| 5,021,945 | 6/1991 | Morrison et al. | 364/DIG. 1 |
| 5,038,282 | 8/1991 | Gilbert et al. | 395/200.01 |
| 5,038,386 | 8/1991 | Li | 382/302 |
| 5,041,971 | 8/1991 | Carvey et al. | 364/DIG. 1 |
| 5,045,995 | 9/1991 | Levinthal et al. | 395/375 |
| 5,047,917 | 9/1991 | Athas et al. | 395/887 |
| 5,049,982 | 9/1991 | Lee et al. | 257/722 |
| 5,056,000 | 10/1991 | Chang | 395/290 |
| 5,072,217 | 12/1991 | Georgiou et al. | 340/825.79 |
| 5,113,523 | 5/1992 | Colley et al. | 364/DIG. 1 |
| 5,121,498 | 6/1992 | Gilbert et al. | 364/DIG. 2 |
| 5,136,582 | 8/1992 | Firoozmand | 370/85.1 |
| 5,142,540 | 8/1992 | Glasser | 371/40.1 |
| 5,146,608 | 9/1992 | Hillis | 395/800 |
| 5,165,023 | 11/1992 | Gifford | 395/311 |
| 5,170,482 | 12/1992 | Shu et al. | 395/800 |
| 5,170,484 | 12/1992 | Gorodalski | 395/800 |
| 5,173,947 | 12/1992 | Chande et al. | 382/154 |
| 5,175,862 | 12/1992 | Phelps et al. | 395/800 |
| 5,175,865 | 12/1992 | Hillis | 395/309 |
| 5,181,017 | 1/1993 | Frey, Jr. et al. | 395/200.15 |
| 5,187,801 | 2/1993 | Zenios et al. | 395/800 |
| 5,189,665 | 2/1993 | Niehaus et al. | 370/58.1 |
| 5,197,130 | 3/1993 | Chen et al. | 395/475 |
| 5,212,773 | 5/1993 | Hillis | 395/200.16 |
| 5,212,777 | 5/1993 | Gove et al. | 395/375 |
| 5,218,676 | 6/1993 | Ben-Ayed et al. | 395/200.15 |
| 5,218,709 | 6/1993 | Fijany et al. | 395/800 |
| 5,230,079 | 7/1993 | Grondalski | 395/375 |
| 5,239,629 | 8/1993 | Miller et al. | 395/311 |
| 5,239,654 | 8/1993 | Ing-Simmons et al. | 364/DIG. 1 |
| 5,251,097 | 10/1993 | Simmons et al. | 361/687 |
| 5,253,359 | 10/1993 | Spix et al. | 395/183.22 |
| 5,265,124 | 11/1993 | Staab et al. | 375/3 |
| 5,280,474 | 1/1994 | Nickolls et al. | 370/60 |
| 5,297,260 | 3/1994 | Kametani | 395/325 |
| 5,355,508 | 10/1994 | Kan | 364/DIG. 1 |
| 5,367,636 | 11/1994 | Colley et al. | 395/200.16 |

OTHER PUBLICATIONS

"Transputer Overview", Transputer Databook; 1st edition, 1989 Chapter 2, pp. 23–41, inmos.

"IMS T425 transputer", pp. 113–123, inmos, Transputer Databook.

"IMS T414 transputer", pp. 179–189, inmos, Transputer Databook.

IBM TDB vol. 27 No. 10A Mar. 1985 pp. 5579–5580 by Kriz et al.

IBM TDB vol. 33 No. 11 Apr. 1991 pp. 362–365 by Bakoglu.

"The Transputer Databook" INMOS Copyright 1988 First Edition 1989 – pp. 1–22,23–41,113–123 179–189.

T. A. Kriz and M. J. Marple, "Multi–Port Bus Structure With Fast Shared Memory", IBM Technical Disclosure Bulletin, vol. 27, No. 10A, pp. 5579–5580, Mar. 1985.

H. B. Bakoglu, "Second–Level Shared Cache Implementation For Multi–processor Computers With A Common Interface For The Second–Level Shared Cache And The Second–Level Private Cache", IBM Technical Disclosure Bulletin, vol. 33, No. 11, pp. 362–365, Apr. 1991.

"The Transputer Databook", INMOS Limited, INMOS Databook Series, INMOS document No.: 72 TRN 203 00, 1988.

H. P. Bakoglu, "Second–Level Shared Cache Implementation For Multiprocessor Computers With A Common Interface For The Second–Level Shared Cache And The Second–Level Private Cache", IBM Technical Disclosure Bulletin, vol. 33, No. 11, pp. 362–365, Apr. 1991.

Mansingh et al., "System Level Air Flow Analysis for a Computer System Processing Unit", *Hewlett–Packard Journal*, vol. 41 No. 5, Oct. 1990, pp. 82–87.

Tewksbury et al., "Communication Network Issues and High–Density Interconnects in Large–Scale Distributed Computing Systems", *IEEE Journal on Selected Areas in Communication*, vol. 6 No. 3, Apr. 1988, pp. 587–607.

Boubekeur et al., "Configuring A Wafer–Scale Two–Dimensional Array of Single–Bit Processors", Computer, vol. 2, Issue 4, Apr. 1992, pp. 29–39.

Korpiharju et al., "TUTCA Configurable Logic Cell Array Architecture" IEEE, Sep. 1991, pp. 3–3.1–3–3.4.

C. K. Baru and S. Y. W. Su, "The Architecture of SM3: A Dynamically Partitionable Multicomputer System", IEEE Transactions on Computers, vol. C–35, No. 9, pp. 790–802, Sep. 1986.

S. P. Booth et al., "An Evaluation of the Meiko Computing Surface for HEP Fortran Farming*", Computer Physics Communications 57, pp. 486–491, 1989.

S. P. Booth et al., "Large Scale Applications of Transputers in HEP: The Edinburgh Concurrent Supercomputer Project", Computer Physics Communications 57, pp. 101–107, 1989.

P. Christy, "Software to Support Massively Parallel Computing on the MasPar MP–1", 1990 IEEE, pp. 29–33.

S. R. Colley, "Parallel Solutions to Parallel Problems", Research & Development, pp. 42–45, Nov. 21, 1989.

J. R. Nickolls, "The Design of the MasPar MP–1: A Cost Effective Massively Parallel Computer", 1990 IEEE, pp. 25–28.

J. F. Prins and J. A. Smith, "Parallel Sorting of Large Arrays on the MasPar MP–1*, The 3rd Symposium on the Frontiers of Massively Parallel Computation", pp. 59–64, Oct. 1990.

J. B. Rosenberg and J. D. Becher, "Mapping Massive SIMD Parallelism onto Vector Architectures for Simulation", Software–Practice and Experience, vol. 19(8), pp. 739–756, Aug. 1989.

J. C. Tilton, "Porting an Interative Parallel Region Growing Algorithm from the MPP to the MasPar MP–1", The 3rd Symposium on the Frontiers of Massively Parallel Computation, pp. 170–173, Oct. 1990.

"Sequent Computer Systems Balance and Symmetry Series", Faulkner Technical Reports, Inc., pp. 1–6, Jan., 1988.

"Symmetry 2000/400 and 2000/700 with the DYNIX/ptx Operation System", Sequent Computer Systems Inc.

"Symmetry 2000 Systems—Foundation for Information Advantage", Sequent Computer Systems Inc.

"Our Customers Have Something That Gives Them an Unfair Advantage", The nCUBE Parallel Software Environment, nCUBE Coroporation.

Y. M. Leung, "Parallel Technology Mapping With Identification of Cells for Dynamic Cell Generation", Dissertation, Syracuse University, May 1992.

"The Connection Machine CM–5 Technical Summary", Thinking Machines Corporation, Oct., 1991.

Fineberg et al., "Experimental Analysis of a Mixed–Mode Parallel Architecture Using Bitonic Sequence Sorting", *Journal of Parallel And Distributed Computing*, Mar. 1991, pp. 239–251.

T. Bridges, "The GPA Machine: A Generally Partitionable MSIMD Architecture", The 3rd Symposium on the Frontiers of Massively Parallel Computation, Oct. 1990, pp. 196–203.

Abreu et al., "The APx Accelerator", The 2nd Symposium on the Frontiers of Massively Parallel Computation, Oct. 1988, pp. 413–417.

D. A. Nicole, "Esprit Project 1085 Reconfigurable Transputer Processor Architecture", CONPAR 88 Additional Papers, Sep. 1988, pp. 12–39.

E. DeBenedictis and J. M. del Rosario, "nCUBE Parallel I/O Software", IPCCC '92, 1992 IEEE, pp. 0117–0124.

T. H. Dunigan, "Hypercube Clock Synchronization: Concurrency: Practice and Experience", vol. 4(3), pp. 257–268, May 1992.

T. H. Dunigan, "Performance of the Intel iPSC/860 and Ncube 6400 hypercubes*", Parallel Computing 17, pp. 1285–1302, 1991.

D. D. Gajski and J. K. Peir, "Essential Issues in Multiprocessor Systems", 1985 IEEE, pp. 9–27, Jun. 1985.

A. Holman, "The Meiko Computing Surface: A Parallel & Scalable Open Systems Platform for Oracle", A Study of a Parallel Database Machine and its Performance – The NCR/ Teradata DBC/1012, pp. 96–114.

Baba et al., "A Parallel Object–Oriented Total Architecture: A–NET", Proceedings Supercomputing, Nov. 1990, pp. 276–285.

Mitchell et al., "Architectural Description of a New, Easily Expandable Self–Routing Computer Network Topology", IEEE INFOCOM, Apr. 1989, pp. 981–988.

K. Padmanabhan, "Hierarchical Communication in Cube–Connected Multiprocessors", The 10th International Conference on Distributed Computing Systems, May 1990, pp. 270–277.

Fineberg et al., "Experimental Analysis of Communication/ Data–Conditional Aspects of a Mixed–Mode Parallel Architecture via Synthetic Computations", *Proceeding Supercomputing '90*, Nov. 1990, pp. 647–646.

Kan et al., "Parallel Processing on the CAP: Cellular Array Processor", *COMPCON* 84, 16 Sep. 1984, pp. 239–244.

Ezzedine et al., "A 16–bit Specialized Processor Design", *Integration The VLSI Journal*, vol. 6 No. 1, May 1988, pp. 101–110.

A. Mudrow, "High Speed Scientific Arithemetic Using a High Performance Sequencer", *ELECTRO*, vol. 6, No. 11, 1986, pp. 1–5.

Alleyne et al., "A Bit–Parallel, Word–Parallel, Massively Parallel Accociative Processor for Scientific Computing", *Third Symposium on the Frontiers of Massive Parallel Computation*, Oct. 8–10, 1990; pp. 176–185.

Jesshoppe et al., "Design of SIMD Microprocessor Array", *IEEE Proceedings*, vol. 136., May 1989, pp. 197–204.

DeGroot et al., "Image Processing Using the Sprint Multiprocessor", *IEEE*, 1989, pp. 173–176.

Nudd et al., "An Heterogeneous M–SIMD Architecture for Kalman Filter Controlled Processing of Image Sequences", *IEEE* 1992, pp. 842–845.

Li et al., "Polmorphic–Torus Network", IEEE Transactions on Computers, vol. 38, No. 9, Sep. 1989 pp. 1345–1351.

Li et al., "Sparse Matrix Vector Multiplication of Polymorphic–Torus", IBM Technical Disclosure Bulltin, vol. 32, No. 3A, Aug. 1989, pp. 233–238.

Li et al., "Parallel Local Operator Engine and Fast P300", IBM Tech. Disc. Bulletin, vol. 32, No. 8B, Jan. 1990, pp. 295–300.

R. Duncan, "A Survey of Parallel Computer Architectures", IEEE, Feb. 90' pp. 5–16.

C. R. Jesshope et al., "Design of SIMD Microprocessor Array", UMI Article Clearing house, Nov. 88'.

Sener Ilgen & Issac Schers, "Parallel Processing on VLSI Associative Memory", NSF Award #ECS–8404627, pp. 50–53.

H. Stone, "Introduction to Computer Architecture", Science Research Associates, 1975, Ch. 8, pp. 318–374.

R. M. Lea, "WASP: A WSI Associative String Processor" Journal of VLSI Signal Processing, May 1991, No. 4, pp. 271–285.

Lea, R. M., "ASP Modules: Cost–Effective Building–Blocks for Real–Time DSP Systems", Journal of VLSI Signal Processing, vol. 1, No. 1, Aug. 1989, pp. 69–84.

Isaac D. Scherson, et al., "Bit Parallel Arithmetic in a Massively–Parallel Associative Processor", IEEE, vo. 41, No. 10, Oct. 1992.

Suprect Singh and Jia–Yuan Han, "Systolic arrays", IEEE, Feb. 1991.

H. Richter and G. Raupp, "Control of a Tokamak Fusion Esperiment by a Set of MULTITOP Parallel Computers", IEEE vol. 39, 1992, pp. 192–197.

Higuchi et al., "IXM2: A Parallel Associative Processor for Semantic Net Processing – Preliminary Evaluation–", IEEE, Jun. 1990, pp. 667–673.

Frison et al., "Designing Specific Systolic Arrays with the API15C Chip", IEEE 1990, xii+808pp., pp. 505–517.

Berg et al., "Instruction Execution Trade–Offs for SIMD vs. MIMD vs. Mixed Mode Parallelism", IEEE Feb. 1991, pp. 301–308.

Raghaven et al., "Fine Grain Parallel Processors and Real–Time Applications: MIMD Controller/SIMD Array", IEEE, May 1990, pp. 324–331.

G. J. Lipovski, "SIMD and MIMD Processing in the Texas Reconfigurable Array Computer", Feb. 1988, pp. 268–271.

R. M. Lea, "ASP: A Cost–effective Parallel Microcomputer", IEEE Oct. 1988, pp. 10–29.

Mark A. Nichols, "Data Management and Control–Flow Constructs in a SIMD/SPMD Parallel Language/Compiler", IEEE, Feb. 1990, pp. 397–406.

Will R. Moore, "VLSI For Artificial Intelligence", Kluwer Academic Publishers, Ch. 4.1.

Mosher et al., "A Software Architecture for Image Processing on a Medium–Grain Parallel Machine", SPIE vol. 1659 Image Processing and Interchange, 1992/279.

*Patent Abstracts of Japan*, vol. 8, No. 105, 17 May 1984, p. 274. App. No. JP–820 125 341 (Tokyo Shibaura Denki KK) 27 Jan. 1984.

W. D. Hillis, *"The Connection Machine"*, The MIT Press, Chapters 1, 3, and 4.

"Joho–syori", vol. 26(3), 1985–3, pp. 213–225, (Japanese).

□ = COMPUTING SYSTEM ELEMENT
● = ZIPPER PORT
▫ = NETWORK NODE

TRANSPARENT MODE
SIMPLE DATA TRANSFER

DATA RE-ORGANIZATION MODE
MOVEMENT OF DATA IN SPACE
EXAMPLES:
    MATRIX TRANSPOSE
    SORT

DATA MODIFICATION MODE
EXAMPLES:
    SCALING
    IMAGE ROTATION

DATA SHARING MODE
SHARED READ/WRITE ACCESS
INTEGRITY THROUGH TOKEN VALIDATION

SHARING OF ACTIVE DATA OBJECTS
OBJECT STATE CHANGES WITHOUT
THE INTERVENTION OF COMPUTERS
A AND B
EXAMPLE:
        COMPUTATIONAL ACCELERATOR

| ALLOCATION IN STORAGE | STORAGE ADDRESS RANGE |
|---|---|
| NORMAL LEVEL UNIQUE | 0000-003F 'X' |
| CALL LEVEL UNIQUE | 0040-007F 'X' |
| EXTERNAL I/O LEVEL UNIQUE | 0080-00BF 'X' |
| RIGHT I/O LEVEL UNIQUE | 00C0-00FF 'X' |
| VERTICAL I/O LEVEL UNIQUE | 0100-013F 'X' |
| LEFT I/O LEVEL UNIQUE | 0140-007F 'X' |
| BCI LEVEL UNIQUE | 0180-00BF 'X' |
| MEMORY PARITY LEVEL UNIQUE | 01C0-00FF 'X' |

| ALLOCATION IN LEVEL | STORAGE ADDRESS OFFSET | |
|---|---|---|
| INPUT BUFFER STARTING ADDRESS | 003C 'X' | 232 |
| INPUT DATA BUFFER COUNT | 003D 'X' | 233 |
| OUTPUT BUFFER STARTING ADDRESS | 003E 'X' | 230 |
| OUTPUT DATA BUFFER COUNT | 003F 'X' | 231 |

THE ACTUAL MEMORY LOCATION IS DETERMINED BY ADDING THE OFFSET TO THE STARTING STORAGE ADDRESS FOR THE LEVEL RANGE. FOR EXAMPLE THE RIGHT INPUT DATA BUFFER COUNT IS LOCATED IN 'X' 00C0 + 003D OR IN 'X' 00FD.

FIG.13

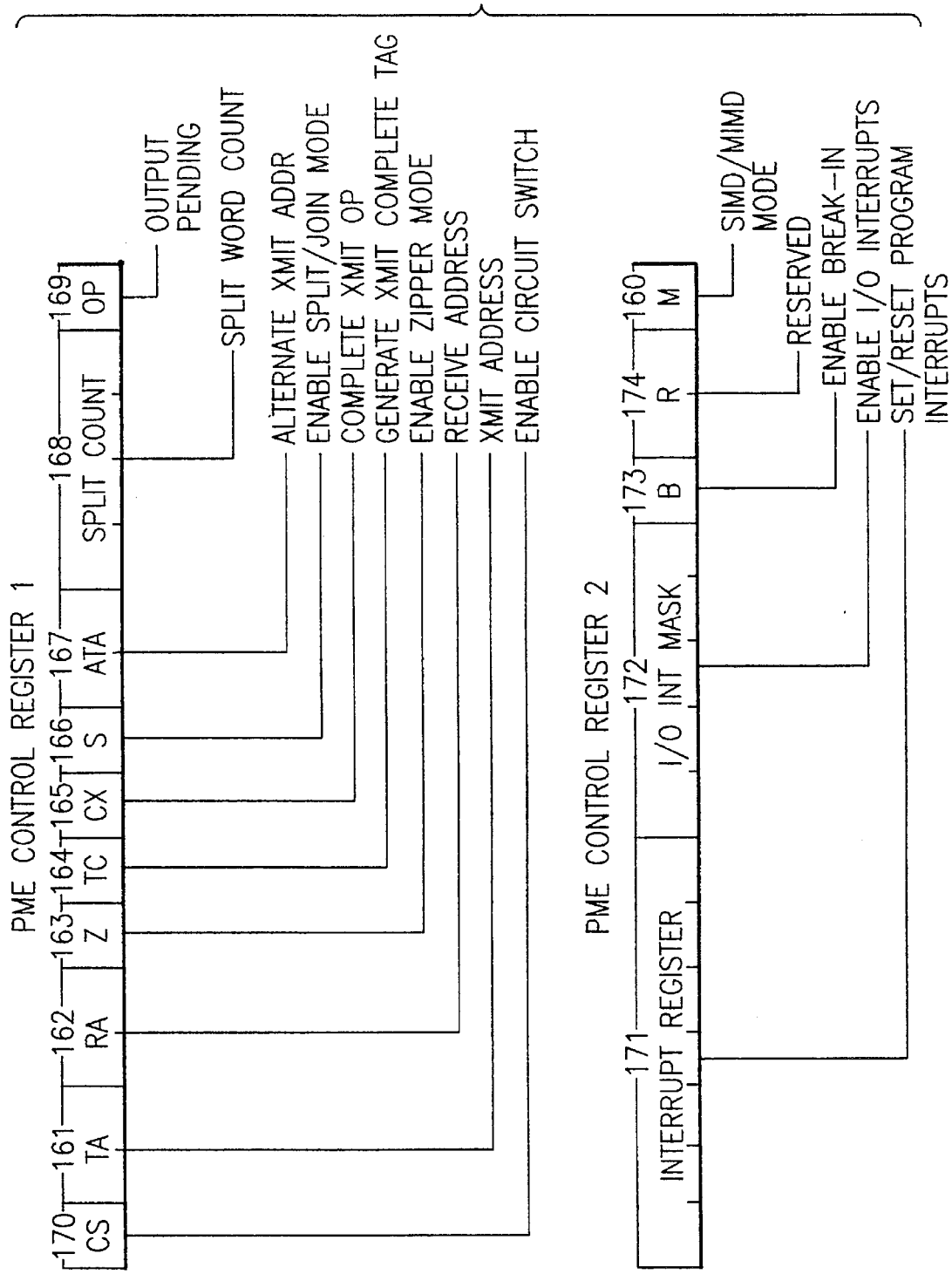

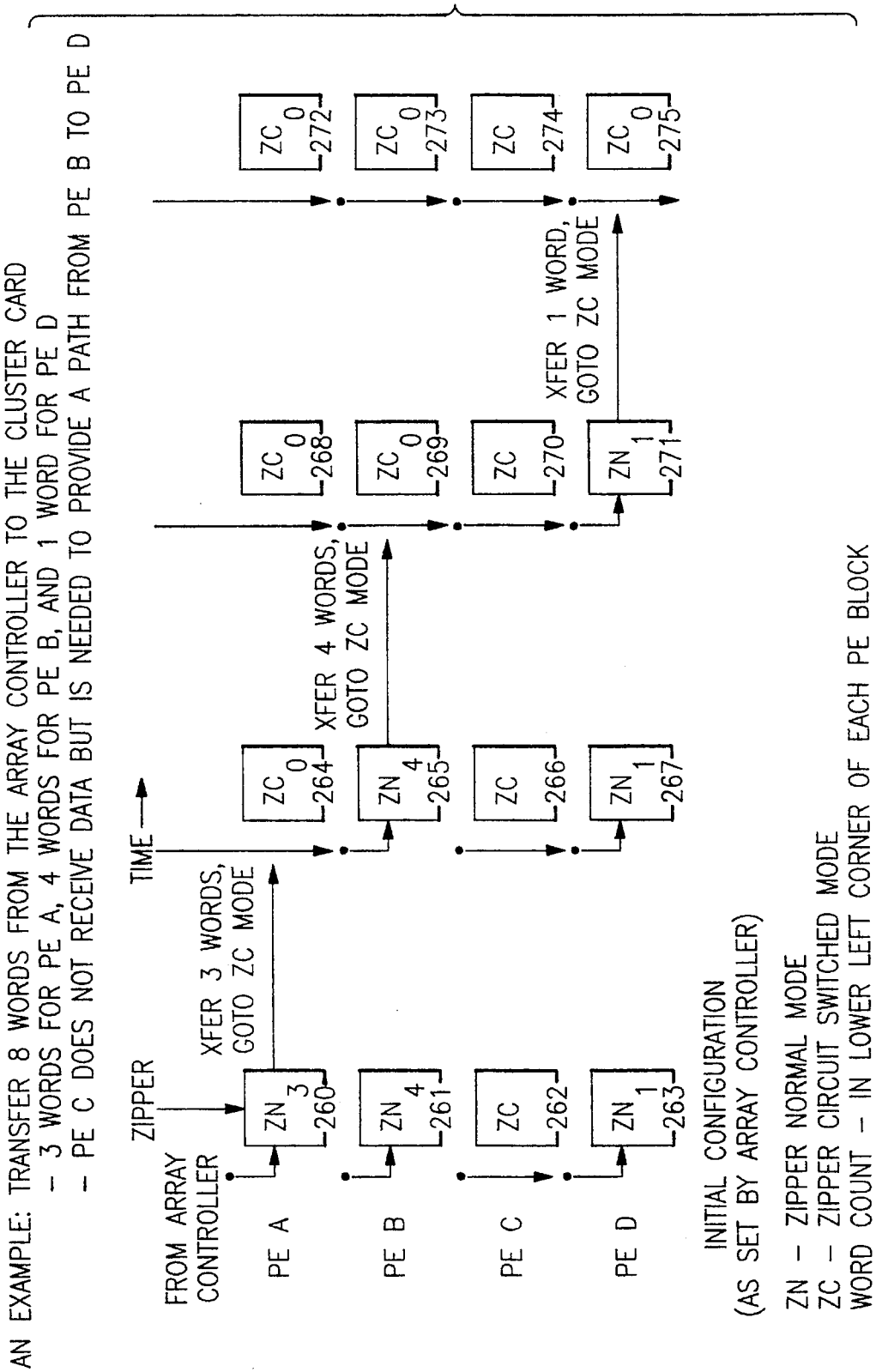

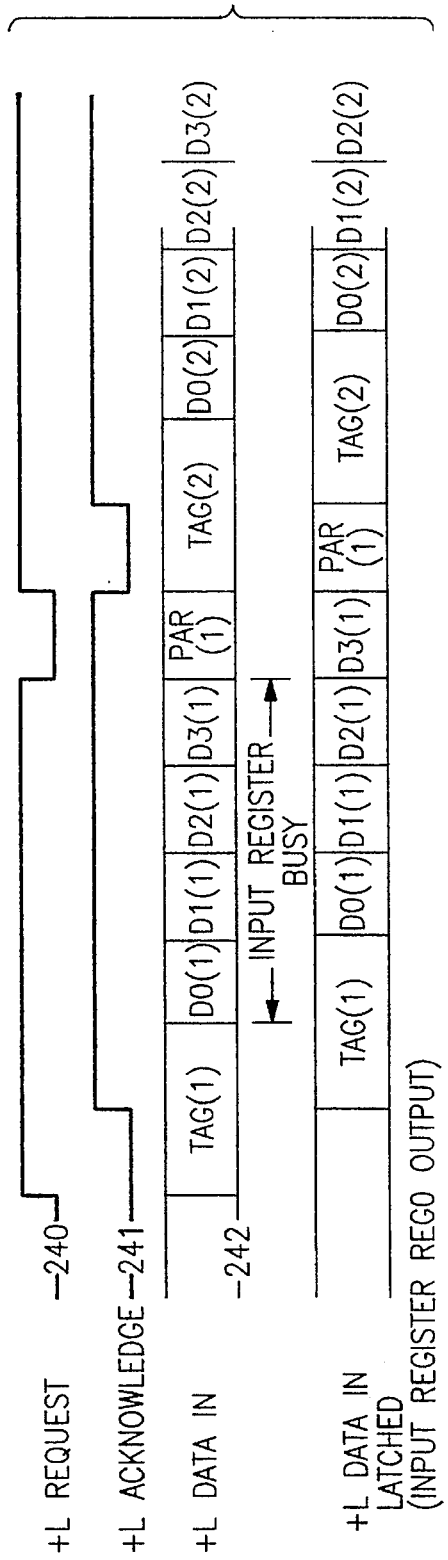
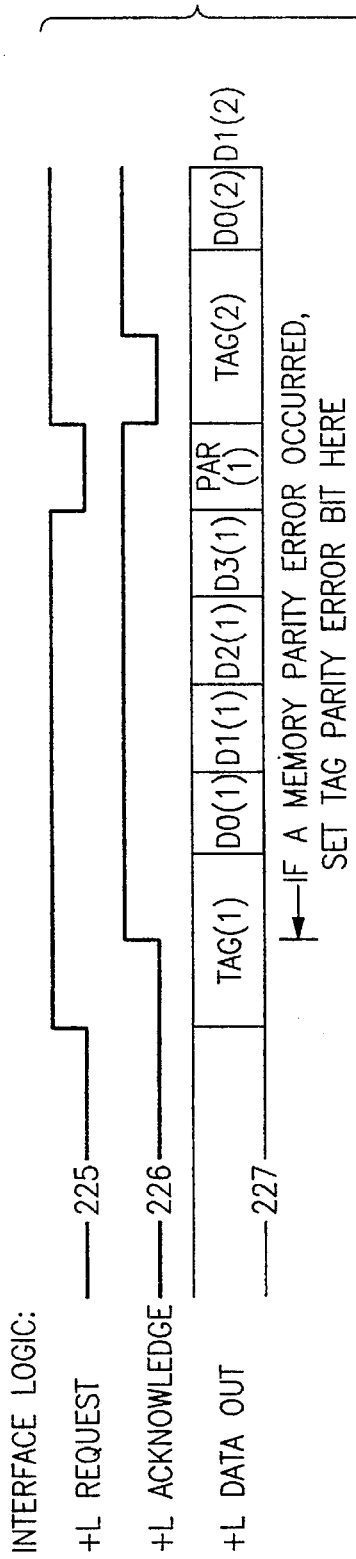

PARALLEL COMPUTER SYSTEM PROVIDING MULTI-PORTED INTELLIGENT MEMORY

This is a continuation of application Ser. No. 07/986,175, filed on Dec. 4, 1992, now abandoned, which is a continuation-in-part of U.S. Pat. No. 5,313,645 which issued on May 17, 1994 from U.S. patent application Ser. No. 07/698,866, filed May 13, 1991, of D. Rolfe entitled "Method For Interconnecting And System Of Interconnected Processing Elements By Controlling Network Density".

and a CIP of application Ser. No. 07/888,684 filed May 22, 1992, now abandoned, of T. Barker, et al., entitled "N-Dimensional Modified Hypercube"; and a CIP of U.S. patent application Ser. No. 07/887,630 filed May 22, 1992, now abandoned of T. Barker, et al., entitled "Advanced Parallel Array Processor";

and a CIP of application Ser. No. 07/887,258 filed May 22, 1992, now abandoned, of M. Dapp, et al., entitled "APAP I/O Programmable Router".

and a CIP of U.S. patent application Ser. No. 07/887,259 filed May 22, 1992, now abandoned, of T. Barker et al. entitled "APAP I/O Zipper Connection".

and a CIP of U.S. patent application Ser. No. 07/887,508 filed May 22, 1992, now abandoned, of T. Barker et al. entitled "Fully Distributed Processing Memory Element".

These co-pending applications and the present application are owned by one and the same assignee, International Business Machines Corporation of Armonk, N.Y.

The descriptions set forth in these co-pending applications are incorporated into the present application by reference.

All above referenced co-pending applications are also are owned by one and the same assignee, International Business Machines Corporation of Armonk, N.Y. These co-pending applications also reference other applications which are related applications.

The descriptions set forth in these co-pending applications are also incorporated by reference.

FIELD OF THE INVENTION

This invention is related to computer systems and particularly to a shared memory parallel computer system which has multiple processors having access to a shared memory.

GLOSSARY OF TERMS

While dictionary meanings are also implied by certain terms used here, the following glossary of some terms may be useful.
HPPI High Speed Communication Link
A high performance parallel interface meeting the criteria of such interface standards as may be defined by IEEE, ANSI or other standards approval agency
Hedgehog Shared Memory System
A hedgehog is an intelligent switch which incorporates shared memory and processing capability used for communication among distributed computer system elements.
Computer System Elements or Computing System Elements
Computer system elements or computing system elements include those elements which can source, sync or modify data.
Interrupt Handlers
Interrupt handlers are system elements which determine the state of a computer immediately following an interrupt.
Link Bandwidth
Link bandwidth is the capacity of a line linking elements to transfer information and is usually measured in bytes per second.

GLOSSARY OF TERMS

ALU
ALU is the arithmetic logic unit portion of a processor.
Array
Array refers to an arrangement of elements in one or more dimensions. An array can include an ordered set of data items (array element) which in languages like Fortran are identified by a single name. In other languages such a name of an ordered set of data items refers to an ordered collection or set of data elements, all of which have identical attributes. A program array has dimensions specified, generally by a number or dimension attribute. The declarator of the array may also specify the size of each dimension of the array in some languages. In some languages, an array is an arrangement of elements in a table. In a hardware sense, an array is a collection of structures (functional elements) which are generally identical in a massively parallel architecture. Array elements in data parallel computing are elements which can be assigned operations and when parallelized can each independently and in parallel execute the operations required. Generally, arrays may be thought of as grids of processing elements. Sections of the array may be assigned sectional data, so that sectional data can be moved around in a regular grid pattern. However, data can be indexed or assigned to an arbitrary location in an array.
Array Director
An Array Director is a unit programmed as a controller for an array. It performs the function of a master controller for a grouping of functional elements arranged in an array.
Array Processor
There two principal types of array processors - multiple instruction multiple data (MIMD) and single instruction multiple data (SIMD). In a MIMD array processor, each processing element in the array executes its own unique instruction stream with its own data. In a SIMD array processor, each processing element in the array is restricted to the same instruction via a common instruction stream; however, the data associated with each processing element is unique. Our preferred array processor has other characteristics. We call it Advanced Parallel Array Processor, and use the acronym APAP.
Asynchronous
Asynchronous is recurring without the same period or time relationship. The results of the execution of a function are unpredictable with respect to the results of the execution of other functions which occur without a regular or predictable time relationships. In control situations, a controller will address a location to which control is passed when data is waiting for an idle element being addressed. This permits operations to remain in a sequence while they are out of time coincidence with any event.
Break-in
A mechanism whereby an I/O port causes a processor transparent context switch and uses processor data flow and control paths to self-manage data transfers.
Circuit Switched/Store Forward
These terms refer to two mechanisms for moving data packets through a network of nodes. Store Forward is a mechanism whereby a data packet is received by each intermediate node, stored into its memory, and then forwarded on towards its destination. Circuit Switch is a mechanism whereby an intermediate node is commanded to logically connect its input port to an output port such that data packets can pass directly through the node towards their destination, without entering the intermediate node's memory.

Circuit Switched

Method of data transfer between PMEs in the array wherein intermediate PMEs logically connect an input port to an output port such that messages pass through the intermediate PE towards the ultimate destination without additional handling by the intermediate PME.

Cluster

A cluster is a station (or functional unit) which consists of a control unit (cluster controller) and the hardware (which may be terminals, functional units, or virtual components) attached to it. Our Cluster includes an array of PMEs sometimes called a Node array. Usually a cluster has 512 PMEs.

Our Entire PME node array consists of a set of clusters, each cluster supported by a cluster controller (CC).

Cluster Controller

A cluster controller is a device that controls input/output (I/O) operations for more than one device or functional unit connected to it. A cluster controller is usually controlled by a program stored and executed in the unit as it was in the IBM 3601 Finance Communication Controller, but it can be entirely controlled by hardware as it was in the IBM 3272 Control Unit.

Cluster Synchronizer

A cluster synchronizer is a functional unit which manages the operations or all or part of a cluster to maintain synchronous operation of the elements so that the functional units maintain a particular time relationship with the execution of a program.

Controller

A controller is a device that directs the transmission of data and instructions over the links of an interconnection network; its operation is controlled by a program executed by a processor to which the controller is connected or by a program executed within the device.

CMOS

CMOS is an acronym for Complementary Metal-Oxide Semiconductor technology. It is commonly used to manufacture dynamic random access memories (DRAMs). NMOS is another technology used to manufacture DRAMS. We prefer CMOS but the technology used to manufacture the APAP is not intended to limit the scope of the semiconductor technology which is employed.

DRAM

DRAM is an acronym for dynamic random access memory, the common storage used by computers for main memory. However, the term DRAM can be applied to use as a cache or as a memory which is not the main memory.

FLOATING-POINT

A floating-point number is expressed in two parts. There is a fixed point or fraction part, and an exponent part to some assumed radix or Base. The exponent indicates the actual placement of the decimal point. In the typical floating-point representation a real number 0.0001234 is represented as 0.1234–3, where 0.1234 is the fixed-point part and –3 is the exponent. In this example, the floating-point radix or base is 10, where 10 represents the implicit fixed positive integer base, greater than unity, that is raised to the power explicitly denoted by the exponent in the floating-point representation or represented by the characteristic in the floating-point representation and then multiplied by the fixed-point part to determine the real number represented. Numeric literals can be expressed in floating-point notation as well as real numbers.

Functional Unit

A functional unit is an entity of hardware, software, or both, capable of accomplishing a purpose.

Gbytes

Gbytes refers to a billion bytes. Gbytes/s would be a billion bytes per second.

Input Transfer Complete Interrupt

Request for program context switch which occurs when an I/O message word is received and is accompanied by a Transfer Complete tag.

ISA

ISA means the Instruction Set Architecture.

Link

A link is an element which may be physical or logical. A physical link is the physical connection for joining elements or units. In computer programming, a link is an instruction or address that passes control and parameters between separate portions of the program. In multisystems, a link is the connection between two systems which may be specified by program code identifying the link as a real or virtual address. Thus generally a link includes the physical medium, any protocol, and associated devices and programming; it is both logical and physical.

MIMD

MIMD is used to refer to a processor array architecture wherein each processor in the array has its own instruction stream, thus Multiple Instruction stream, to execute Multiple Data streams located one per processing element.

Module

A module is a program unit that is discrete and identifiable or a functional unit of hardware designed for use with other components. Also, a collection of PEs contained in a single electronic chip is called a module.

Node

Generally, a node is the junction of links. In a generic array of PEs, one PE can be a node. A node can also contain a collection of PEs called a module. In accordance with our invention a node is formed of an array of PMEs, and we refer to the set of PMEs as a node. Preferably a node is 8 PMEs.

Node Array

A collection of modules made up of PMEs is sometimes referred to as a node array. A node array is usually more than a few PMEs, but the term encompasses a plurality.

PME or Processor Memory Element

PME is used for a processor memory element. We use the term PME to refer to a single processor, memory and I/O capable system element or unit that forms one of our parallel array processors. A processor memory element is a term which encompasses a picket. A processor memory element is 1/nth of a processor array which comprises a processor, its associated memory, control interface, and a portion of an array communication network mechanism. This element can have a processor memory element with a connectivity of a regular array, as in a picket processor, or as part of a subarray, as in the multi-processor memory element node we have described.

Routing

Routing is the assignment of a physical path by which a message will reach its destination. Routing assignments have a source or origin and a destination. These elements or addresses have a temporary relationship or affinity. Often, message routing is based upon a key which is obtained by reference to a table of assignments. In a network, a destination is any station or network addressable unit addressed as the destination of information transmitted by a path control address that identifies the link. The destination field identifies the destination with a message header destination code.

Runtime Software

Software which executes on a processing element. It includes operating systems, executive programs, application programs, service programs, etc.

SIMD

A processor array architecture wherein all processors in the array are commanded from a Single Instruction stream to execute Multiple Data streams located one per processing element.

Swapping

Swapping interchanges the data content of a storage area with that of another area of storage.

Synchronous Operation

Synchronous operation in a MIMD machine is a mode of operation in which each action is related to an event (usually a clock); it can be a specified event that occurs regularly in a program sequence. An operation is dispatched to a number of PEs who then go off to independently perform the function. Control is not returned to the controller until the operation is completed.

If the request is to an array of functional units, the request is generated by a controller to elements in the array which must complete their operation before control is returned to the controller.

VLSI

VLSI is an acronym for very large scale integration (as applied to integrated circuits).

Zipper

A zipper is a new function provided. It allows for links to be made from devices which are external to the normal interconnection of an array configuration. The function allows a dynamic breaking of a group of network rings. When it is "zipped," data can traverse the rings without entering or leaving the network. When it is "unzipped," the rings are broken, forming an edge to the network through which data traversing the rings enter or leave the network. A zipper provides a facility to break rings forming an edge to the network through which data traversing the rings enter or leave the network. A zipper node is a node which is adjacent to a zipper.

BACKGROUND OF THE INVENTION

If one reviews the literature, there will be found several computer systems having a single shared memory and multiple processing units. These processing units, or functional units, and the shared memory must be connected to one another. The interconnection can be made through a switch. In this way of interconnecting computers, data enters the switch at some port, and after some delay, is consumed at the other port. This transport, interchange, shift, exchange, or router function, is provided by a switch. While the implementation of the switch may involve buffering the data within the switch, the implementation is essentially memoryless. Now, when multiple processors are employed with shared memory, data objects are stored within a shared memory device. Those computing systems that have access to the device can share the objects residing there. If some of the computing systems sharing objects have write access to these objects a variety of issues that concern coherence and correctness arise. The art has recognized these concerns and there are some ways to address these solutions, but they don't handle the problems adequately for larger parallel systems.

Distributed shared memory computer systems have been described in publications and patents which have not coherently handled the problems of communication between computers sharing data. Some of these publications and patents will be cited.

Prior Art: Publications

1. The Transputer Databook, illustrated by the First Edition, 1989, shows the Inmos system of a single chip with processor, memory and communication links useable in networks which was cited in the priority dockets as prior ad is again referenced to show a chip that could be used in a network. We consider this Inmos publication as illustrative of elements which could be used with hindsight to satisfactorily implement our invention. It makes no suggestion that the transputer chips could be implemented with our invention. We would prefer our invention to be implemented with the chips described in our cited related applications.
2. IBM's Technical Disclosure Bulletin Vol. 27, No. 10X, March 1985, of T. A. Kriz et al, illustrates a multi-port bus structure with a fast shared memory which allows the building of a distributed system with networks of an arbitrary form.
3. IBM's TDB Vo. 33, No. 11, April 1991, article of Bakogly shows a second=level shared cache implementation for multiprocessor computers with a common interface for the second level shared cache and the second level private cache to implement tightly coupled shared memory multiprocessors.
4. We should also note that there have been some systems under development that do have some intelligence in the switching apparatus. No prior development has been known to address our concerns.

Prior Art: Patents

European, Japanese and U.S.A. patent literature is dissimilar to the invention.
1. European Patent Application 89313252.2, published under publication No. 429 733 A2, filed 19 Dec. 1989, deals with a multiprocessor system and method arranged, in one embodiment as an image graphics processor. A crossbar switch serves to establish processor Memory Links and the entire image processor is on a single silicon chip. However, there is no intelligence in the switch and the machine is a SIMD machine and not a SIMD/MIMD machine, like the system we have designed.
2. U.S. Pat. No. 5,056,000, issue Oct. 8, 1991 to Robin Chang of IBM illustrates the use of an interconnection switch with a shared memory SPMD.
3. U.S. Pat. No. 4,958,273, issued Sep. 18, 1990 to Anderson et al of IBM, which discloses a redundancy technique for protecting data, and U.S. Pat. No. 5,006,978, issued Apr. 9, 1991 to Philip Neches of Teradata Corporation illustrates a rudimentary active logic intelligence network without data modules; while both generally disclose memory accessing/switching networks in support of parallel processing between a multiplicity of memory modules.
4. U.S. Pat. No. 5,041,971, issued Aug. 20, 1991 to Bolt Beranek and Newman inventors Carvey et al, shows a parallel processing computer with no intelligence in the switch, and U.S. Pat. No. 5,072,217 issued Dec. 10, 1991 to Georgiou et al of IBM, shows a one-sided cross-point switch for control of a switching matrix; while both disclose memory accessing/switching networks in support of parallel processing between a multiplicity of processors and a multiplicity of memory modules.

5. There are other patents which related to distributed/multiported memories, such as U.S. Pat. Nos. 4,394,726; 4,809,159; and 4,956,772.

When the connection of computer systems in a parallel system is provided by a switch, the number of processing units sharing memory increases the switch complexity and latency increases non-linearly. This effect limits the use of shared memory to systems having a small number of processing units.

Using shared objects residing in shared memory means that they can only change state through write accessing by the processing units of the system. The write access contention can easily grow to unacceptable levels. When processing units are added, the number of processors requiring access to the shared memory simultaneously increases. Contentions will exist and the amount of contention increases as the number of processors increase. When the connection and contention mediator in the system takes the form of a switch, the complexity of contention mediation is geometrically proportional to the number of processors.

The alternative, such as that of such systems as the CM-5 of Thinking machines, is to in some manner provide multiple computers each with its own private memory, as does the Inmos chip, and to interconnect these using a variety of switches. These systems help avoid the problems connected with shared memory systems. However, sharing of objects by multiple computers becomes very complex and the overhead associated with maintaining a consistent view of shared objects grows non-linearly with the number of processors.

Typically in the prior art, computer systems sharing DASD, or other devices are interconnected with a variety of switches or switching networks. Here too, as the number of devices increase, the complexity and overhead associate with sharing grows geometrically.

What is needed is a way to interconnect multiple functional units, which would desirably include processing units, a shared memory, and DASD and other devices. It would be desirable to connect many various system or enterprise components without great overhead or complexity as units are added to the computer system.

SUMMARY OF THE INVENTION

Our invention deals with the use of a computing system device providing a multi-ported intelligent memory that can be used to connect (switch) a variety of computer system elements (herein sometimes called CSE). The multi-ported intelligent shared memory organized into a collection of cells or nodes which we call the hedgehog. Each node comprises a finite computer memory and a processing unit, and in which at least K of the interconnecting links of the device have a zipper port. The hedgehog system combines the characteristics of a switch with those of a shared memory. In addition, objects in the hedgehog shared memory can change state without the intervention of the CSEs. Our objectives are achieved by packaging memory and processing elements on a chip along with a switch function. The hedgehog resolves contention and coherency issues that arise for the several CSEs which share the hedgehog in a communication network, and these issues require no explicit communication.

The system provides transparent data transport. Data can be sourced at any zipper by the CSEs attached to that zipper and this data can be switched to any other zipper in the system and thus to the CSEs attached to that zipper. In this manner switching is accomplished under the control of the processing elements within the shared memory. This provides high variability for switching, and permits the use of, but may not require, the use of packet headers in the communication across the network, depending on the application.

The sytem provides a data re-organization mode. In this mode data is moved from one CSE to another and during this movement of data the data is able to be re-organized. In this mode of operation, the rows and columns of a matrix could be interchanged, or a list of elements sorted.

A data modification mode for the system is also provided. In this mode data is modified as it is moved between CSEs. In this mode of operation the elements of a matrix can be multiplied by a scalar or similarly transformed.

A transparent data sharing mode provides the system with the capability for data objects to be shared by the CSEs attached to the hedgehog. Protocols for maintaining desired levels of data coherence can be implemented within the hedgehog chip memory and these protocols do not have to be processed outside the chip and thus do not require external resources.

In addition, data sharing can be combined with re-organization. Data residing in the hedgehog chip can undergo re-organization without the intervention of the sharing systems. The connected systems can initiate these reorganizations by sending messages to the hedgehog chip's objects. Sharing systems can be prevented from viewing intermediate states without knowledge of the protocols required to prevent this by implementing the protocols within the hedgehog itself.

In addition, the system provides data sharing with modification. Data residing in the hedgehog chip can undergo re-organization without the direct intervention of the sharing systems. The connected systems can initiate modifications by sending messages to the hedgehog objects. Sharing systems can be prevented from viewing intermediate states without knowledge of the protocols required to prevent this by implementing the protocols within the memory itself.

Within the hedgehog chip a variety of security/integrity measures can be implemented by associating chip objects with secure tokens, known only to the hedgehog chip processors. Only those processes bound to those tokens will then have access to the objects. This also does not require the use of processing resources outside of the hedgehog chip.

Hedgehog chip objects can, without the use of outside processing resources, send messages to each other which can then initiate state transitions of those objects. In this mode of operation, the hedgehog CSE element becomes a shared computational resource.

By combining memory, communication, and processing functions within the hedgehog, communication required to assure coherence between CSEs can be dramatically reduced.

Unauthorized access to data can be prevented by the memory itself.

Memory latency which is seen by all computers is made uniform to shared objects.

And, data format conversion can be performed by the memory of the chip itself.

These and other improvements are set forth in the following detailed description. For a better understanding of the invention with advantages and features, refer to the description and to the drawings.

BRIEF DESCRIPTION OF THE DRAWINGS

FIG. 13 is a schematic illustrative of the reserved storage locations for interrupts and I/O processing.

FIG. 14 is a schematic illustrative of the PME Control Registers which supporrt the implementation of interrupts and interconnection network.

FIG. 15 is a schematic illustrative of the Zipper Receive Sequence.

FIG. 16 is a schematic illustrative of the input interface sequencing between PME I/Os.

FIG. 21 is a schematic illustrative or the output interface sequencing between PME I/Os.

(Note: For convenience of illustration, FIGURES may be separated in parts and as a convention we place the top of the FIGURE as the first sheet, with subsequent sheets proceeding down and across when viewing the FIGURE, in the event that multiple sheets are used.)

Our detailed description explains the preferred embodiments of our invention, together with advantages and features, by way of example with reference to the following drawings.

DETAILED DESCRIPTION OF THE INVENTION

Before considering our preferred embodiments in detail, it may be worthwhile to illustrate, by way of example, our hedgehog system. The hedgehog device is a high performance switch with processing and memory capabilities. It can be implemented using the PME devices described in U.S. patent application Ser. No. 07/887,630, filed May 22, 1992, of T. Barker, et al., entitled "Advanced Parallel Array Processor". The hedgehog device is a shared electronic memory storage provided by these chips with 32K 16 bit processing elements. Each PE can address 64K bytes on the hedgehog chip, and thus 64K bytes of the hedgehog memory which is the aggregation of the shared memory portion of the chips we have provided on the chip itself. On the hedgehog chip itself eight PEs reside, as in the earlier applications which are described in the above related applications. This memory/PE chip is called a node.

Figure 1:
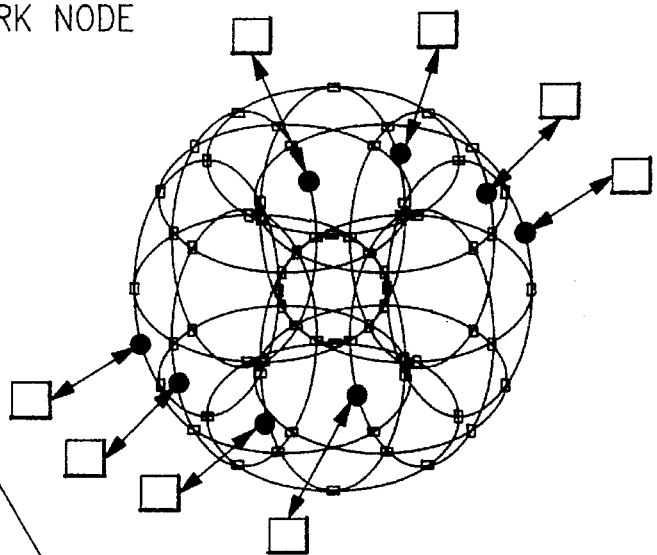
FIG. 1 shows schematically an overview of the preferred embodiment and particularly shows a plurality of hedgehog CSE elements and zipper ports as part of a connection network with many network nodes for the various data manipulations possible.

Each node is connected to eight other nodes by 8, 8 bit bidirectional data paths. These nodes can be interconnected in a variety of topologies. One such topology is that already described in U.S. patent application Ser. No. 07/698,866, filed May 13, 1991 and entitled "Method for interconnecting and system of interconnected processing elements" by Rolfe, which is incorporated by reference. Another one of such topologies is the four dimensional torus described in the preferred embodiment as illustrated by FIG. 1. On chip PEs are connected in a cube connected network with 8 bit dual simplex data paths. Thus, there is one PE for each off chip data path, and this data path has a zipper connection port interface. The PEs implement the same fixed point instruction set as illustrated for the Advanced Parallel Array Processor, a known instruction set with additions.

A collection of sixty four nodes is called a cluster and associated with each cluster is a cluster controller. The collection of 64 clusters can be the entire system or machine and associated with the machine is a cluster synchronizer. The controllers and synchronizer are involved in opening the network fabric with the zipper connection for input/output operations, SIMD control and error detection or isolation. The physical connection to the CSE elements is through the high speed communications link, such as HPPI and any machine that implements the link connection can connect to the hedgehog.

Each hedgehog processor has its own instruction counter. The processor can run in MIMD mode. In addition the cluster controllers can broadcast instructions or instruction addresses to the PEs of the communication network for SIMD mode operation. The broadcasting of instruction addresses permits modes of operation that grade smoothly from a pure SIMD mode of operation to pure MIMD.

Input/Output

Data moves into hedgehog memory though the high speed communications links, such as HPPI or another link. The bandwidth of these links and the input output bandwidth of the hedgehog node are matched by presenting data from the link to more than one hedgehog node simultaneously. Hedgehog nodes that are connected to the link in this way are called the zipper nodes. The number of zipper nodes in the hedgehog memory is set so as to match the link bandwidth. Thus, the number of zipper nodes within the hedgehog shared memory is K and K is given by $K=\beta_1/\beta_n$ where $\beta_1$ is the bandwidth of the link and $\beta_n$ is the bandwidth of the node. Thus, in the preferred embodiment, for our preferred chip, K would be =8. This can also be referred to as the length of the zipper. Zipper nodes will be positioned along a single dimension of the network. A second zipper is implemented along another dimension of the system to increase the performance of certain applications (in particular matrix transpose). By the use of zipper nodes and appropriate interrupt handlers in the nodes, data can be transferred to the hedgehog memory at link speed if the host is able to sustain the link bandwidth also. More complex I/O operations are also possible.

Programming Models

The hedgehog shared memory system can operate in both MIMD and SIMD modes. The MIMD mode is provided by having a program counter in each processing element within the hedgehog. The hedgehog is fundamentally a multiple instruction multiple data machine. There is no need for an operating system in each node. All the code running in a PE can be viewed as application specific code, including the interrupt handlers. This permits an application designer to take advantage of all application characteristics to optimize performance. For example, certain applications as SORT, or FFT (Fast Fourier Transform) have deterministic message passing patterns and so do not need to interrogate packet headers to determine message destinations.

The SIMD single instruction multiple data machine is implemented with cluster controllers and a machine synchronizer in addition to the PEs and the interconnection network. There is one cluster controller for each 64 node cluster for a total of 64 controllers. There is only one machine synchronizer for a hedgehog shared memory system. A control bus connects the controllers to the node and through the use of the control bus, a SIMD mode of operation is implemented.

In SIMD mode the same instruction is broadcast on the control bus to each PE and the machine is synchronized at each end-op. In addition, each node may be made to direct a fetch and execute some sequence of instructions from each processor's storage. At the end of the sequence the machine is re-synchronized. If each sequence is the same the SIMD machine is a model at a macro level of execution. However, as the sequences of instruction at each node become increasingly different during the course of execution of an application the system moves by degrees back into the MIMD mode. In this way it can be seen that the hedgehog shared memory system begins to blur the MIMD and SIMD modes of computing.

The Preferred Embodiment

Turning now to our invention in greater detail, it will be seen that FIG. 1 illustrates our preferred embodiment of our shared memory switching device which we call a hedgehog. The device comprises a communication network which interconnects a plurality of CSEs as nodes of the device. Each of these CSEs have a multi-ported intelligent memory that can be used to connect (switch) a variety of computer system elements including computers and direct access storage devices (DASDs). The multi-ported intelligent shared memory is organized into a collection of cells or nodes. Each node comprises a finite computer memory and a processing unit, and at least K of the nodes of the device are adjacent to a zipper port. The CSE combines the characteristics of a switch with those of a shared memory. In addition, objects in the shared memory can change state without the intervention of the computers that are interconnected to the device (CSE and port) which we call a hedgehog chip. Our objectives are achieved by packaging memory and processing elements on a chip along with a switch function. The PM/E hedgehog resolves contention and coherency issues that arise for the several computing devices which share the hedgehog in a communication network, and these issues require no explicit communication.

Figure 2:
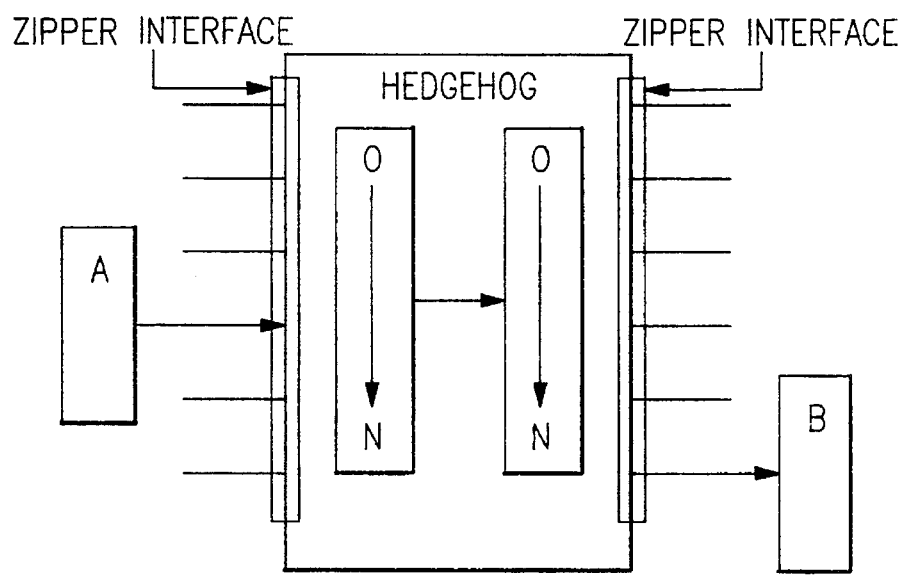
FIG. 2 shows the transparent mode in more detail, and illustrates the data transparent mode for a simple data transfer.

With the system as shown in FIG. 2 transparent data transport is provided as data can be sourced at any zipper by the CSE attached to that zipper and this data can be switched to any other zipper in the system and thus to the CSE attached to that zipper. In this manner switching is accomplished under the control of the processing elements within the shared memory. This provides high variability for switching, and permits the use of, but may not require, packet headers in the communication across the network, depending on the application.

Figure 3:
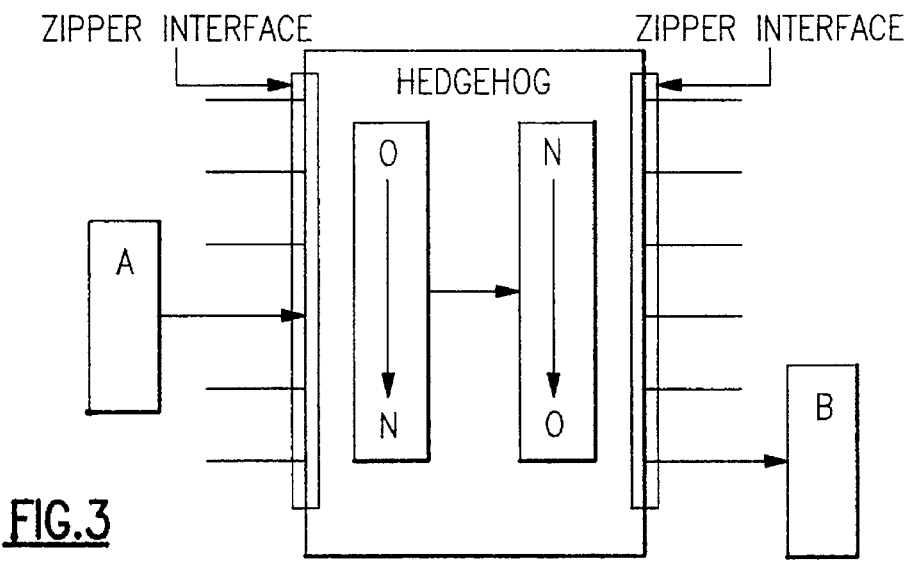
FIG. 3 shows the data Re-organization mode for movement of data in space.

FIG. 3 illustrates our data re-organization mode. In this mode data is moved from one CSE to another and during this movement of data the data is able to be re-organized. In this mode of operation, the rows and columns of a matrix could be interchanged, or a list of elements sorted.

Figure 4:
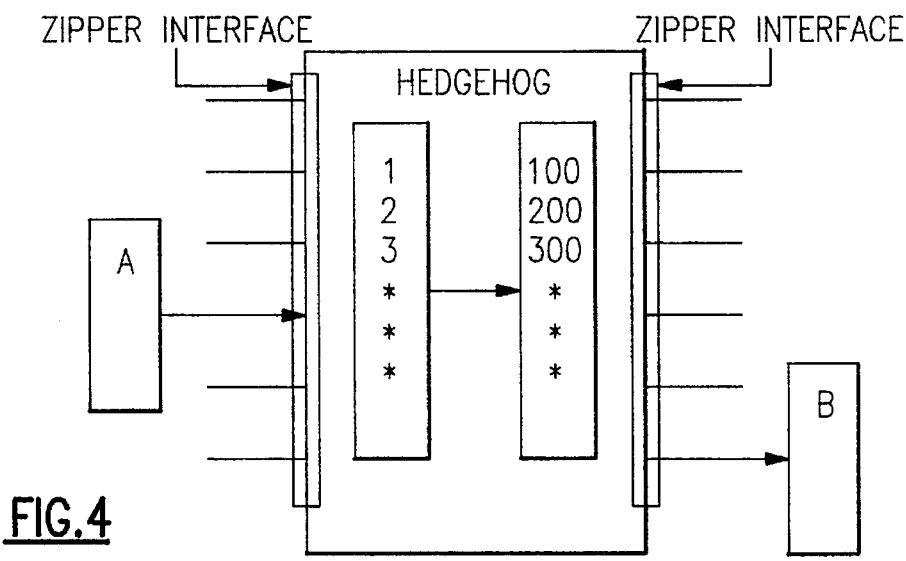
FIG. 4 hows the data modification mode, which can provide scaling and image rotation capabilities.

FIG. 4 illustrates a data modification mode. In this mode data is modified as it is moved between CSEs. In this mode of operation the elements of a matrix can be multiplied by a scalar.

Figure 5:
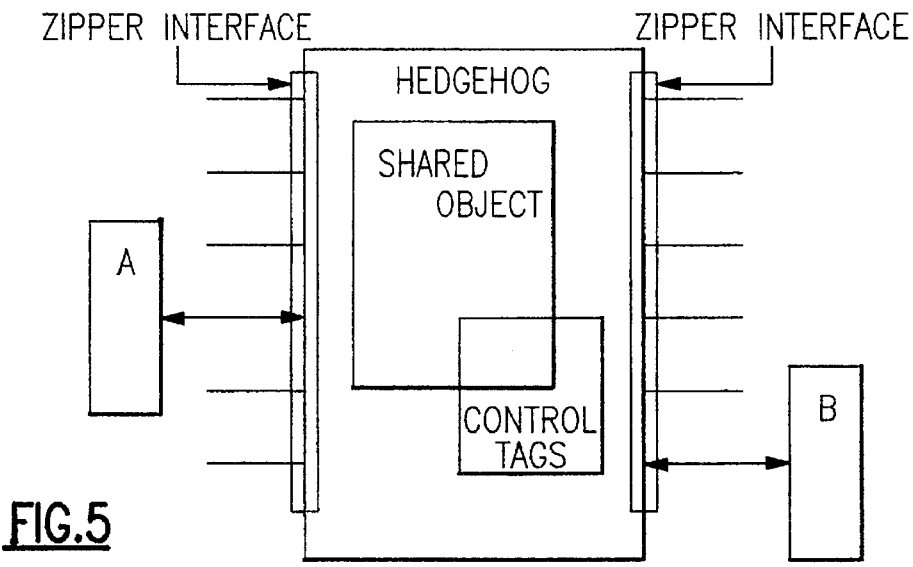
FIG. 5 illustrates the data sharing mode of the hedgehog chip with its zipper interfaces.

A transparent data sharing mode is illustrated by FIG. 5. In this mode data objects can be shared by the CSEs attached to the hedgehog. Protocols for maintaining desired levels of data coherence can be implemented within the hedgehog chip memory and these protocols do not have to be processed outside the chip and thus do not require external resources.

In addition, data sharing can be combined with re-organization. Data residing in the hedgehog chip can undergo re-organization without the intervention of the sharing systems. The connected systems can initiate these reorganizations by sending messages to the hedgehog chip's objects. Sharing systems can be prevented from viewing intermediate states without knowledge of the protocols required to prevent this by implementing the protocols within the hedgehog itself.

In addition, the system provides data sharing with modification. Data residing in the hedgehog chip can undergo re-organization without the direct intervention of the sharing systems. The connected systems can initiate modifications by sending messages to the hedgehog objects. Sharing systems can be prevented from viewing intermediate states without knowledge of the protocols required to prevent this by implementing the protocols within the memory itself.

Within the hedgehog system a variety of security/integrity measures can be implemented by associating chip objects with secure tokens, known only to the hedgehog system processors. Only those processes bound to those tokens will then have access to the objects. This also does not require the use of processing resources outside of the hedgehog system.

Figure 6:
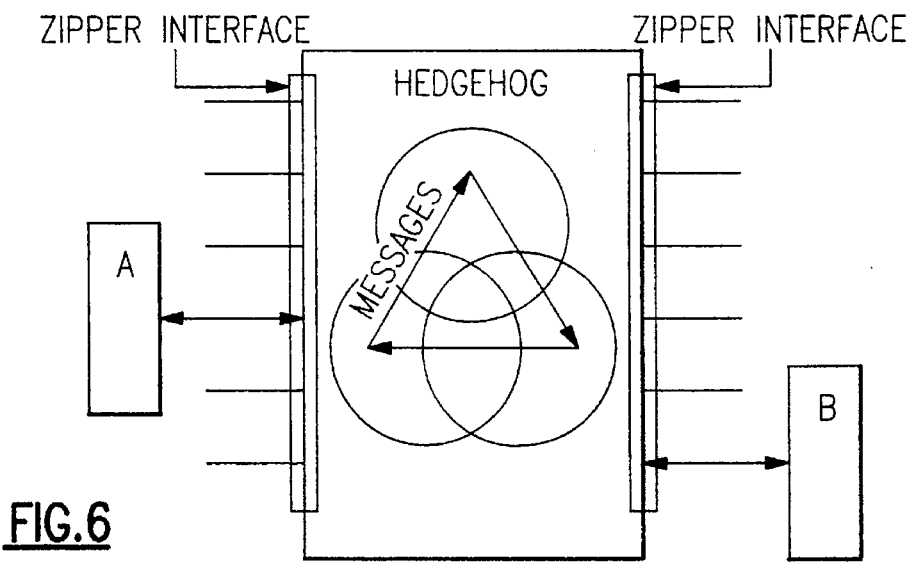
FIG. 6 shows how the hedgehog CSE element with its memory and zipper interfaces can share active data objects and provide object state changes in the chip without the intervention of external resources.

Hedgehog system objects can, without the use of outside processing resources, send messages to each other which can then initiate state transitions of those objects. In this mode of operation, the hedgehog system becomes a shared computational resource as illustrated by FIG. 6.

As a result of our system developments, communication requirements between computers sharing data to insure coherence can be dramatically reduced.

Unauthorized access to data can be prevented by the memory itself.

Memory latency which is seen by all computers is made uniform to shared objects.

And, data format conversion can be performed by the memory of the chip itself.

DESCRIPTION OF A ZIPPER

In U.S. patent application Ser. No. 07/887,259, filed May 22, 1992, of T. Barker, et al., entitled "APAP I/O Zipper Connection" we described a zippper for a fast I/O for a multi-PME computer system providing a way to break into a network coupling to alternate network couplings. The system coupling is called a zipper.

Our I/O zipper concept can be used to implement the concept that the port into a node could be driven by the port out of a node or by data coming from the system bus. Conversely, data being put out of a node would be available to both the input to another node and to the system bus. Outputting data to both the system bus and another node is not done simultaneously but in different cycles. The coupling dynamically toggles the network between a network without an edge and a network with an edge. Data passes into the network or out of the network through the edge when it is active, and the coupling permits dispersal of data entering the network or collection of data leaving the network such that the data rate through the edge matches both the sustained and peak data rates of the system external to the network.

A zipper permits a dynamic breaking of a group of network rings. When it is "zipped," data can traverse the rings without entering or leaving the network. When it is "unzipped," the rings are broken, forming an edge to the network through which data traversing the rings enter or leave the network.

The zipper was described with respect to the prior patent application, U.S. Ser. No. 611,594, entitled "Parallel Associative Processor System," which describes the idea of integrating computer memory and control logic within a single chip, replicating the combination within the chip and building a processor system out of replications of the single chip. This approach leads to a system which provides massively parallel processing capability at the cost of developing and manufacturing only a single chip type while enhancing performance capability by reducing the chip boundary crossings and line length.

The original patent described utilization of 1-dimensional I/O structures with multiple SIMD Processing Memory Elements (PMEs) attached to that structure within the chip. This application and the referenced related applications extend that concept to dimensions greater than one and includes a full I/O system with both data transfer and program interrupts. The description which follows will be in terms of 4-dimensional I/O structures with 8 SIMD/MIMD PMEs per chip; however that can be extended to greater dimensionality or more PMEs per dimension as described in U.S. Ser. No. 611,594.

This application and its related applications extend the concepts from the interprocessor communication to the external Input/Output facilities. Additionally, it describes the interfaces and elements required to control the processing array. In summary, three types of I/O are described: (a) Inter-processor, (b) Processors to/from external, and (c) Broadcast/control. Massively parallel processing systems require all these types of I/O bandwidth demands to be balanced with processor computing capability. Within the array these requirements will be satisfied by replicating a 16-bit instruction set architecture computer that is augmented with very fast interrupt state swapping capability and is referred to as the PME in subsequent text. The characteristics of the PME are unique when compared with the processing elements on other massively parallel machines. It permits the processing, routing, storage and I/O to be completely distributed. This is not characteristic of any other design.

Figure 7:
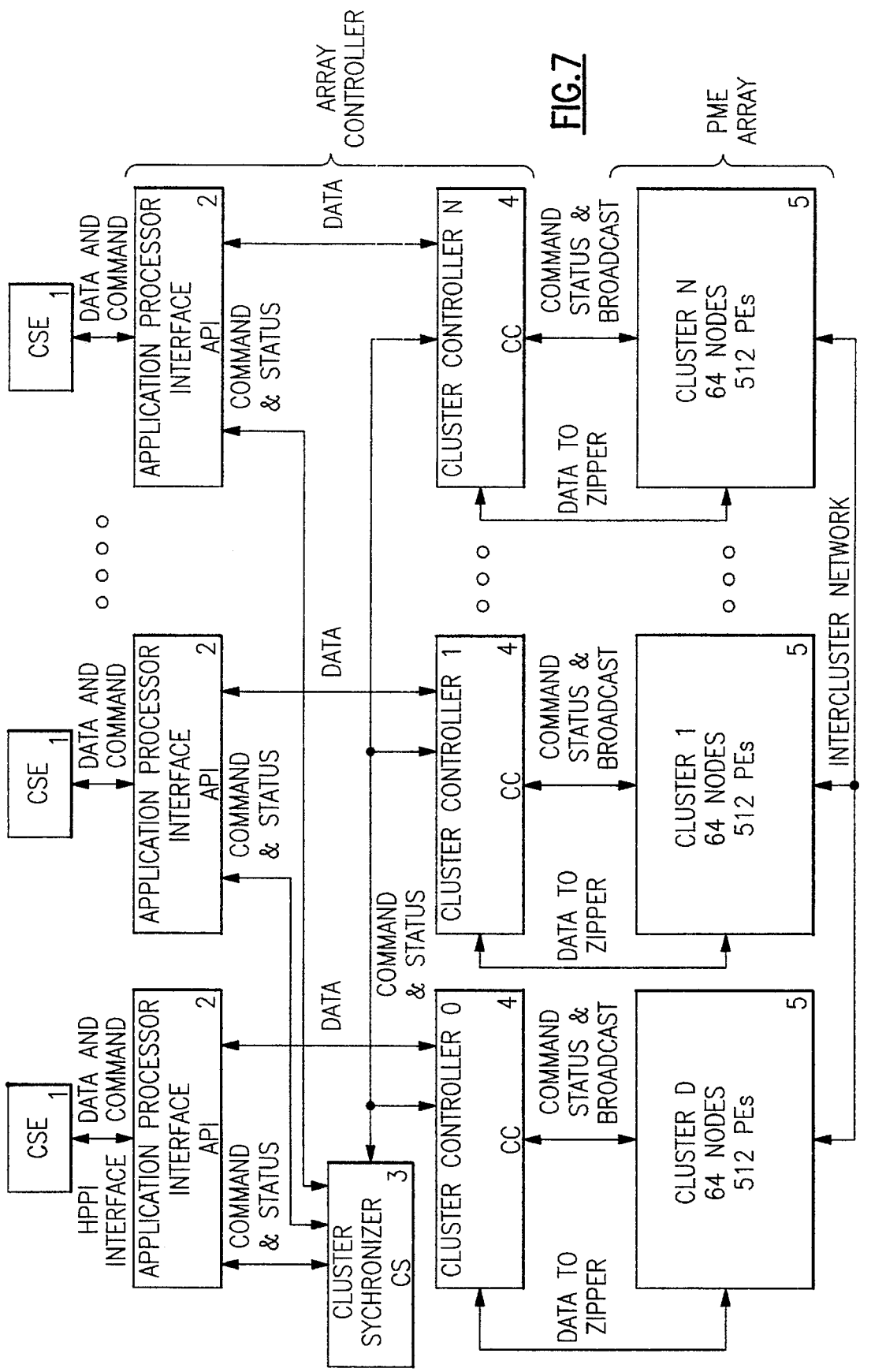
FIG. 7 is a functional block diagram illustrative of a typical Hedgehog Array particularly showing the major elements of the Hedgehog, and the Hedgehog Interface to a set of CSEs.

The block diagram for the Hedgehod Array "(APAP)", disclosed in detail in the referenced application above is show in FIG. 7. The Hedgehog is an adjunct to a set of CSEs. 1. Data and commands are issued by the communication and control program executing on the CSE. These data and commands are received and translated in the Application Program Interface (API) 2 of the Array Director. The API then passes data and commands through the Cluster Synchronizer 3 and Cluster Controllers 4 to the Clusters 5. The clusters provide the memory, parallel processing, and switch routing of the Hedgehog. The functions provided by the Cluster Synchronizer and Cluster Controllers are to route the data and commands to the proper Cluster and to provide load balancing among the clusters. More details of the controller are described in the "Advanced Parallel Processor Array Director" application refered to above.

Figure 8:
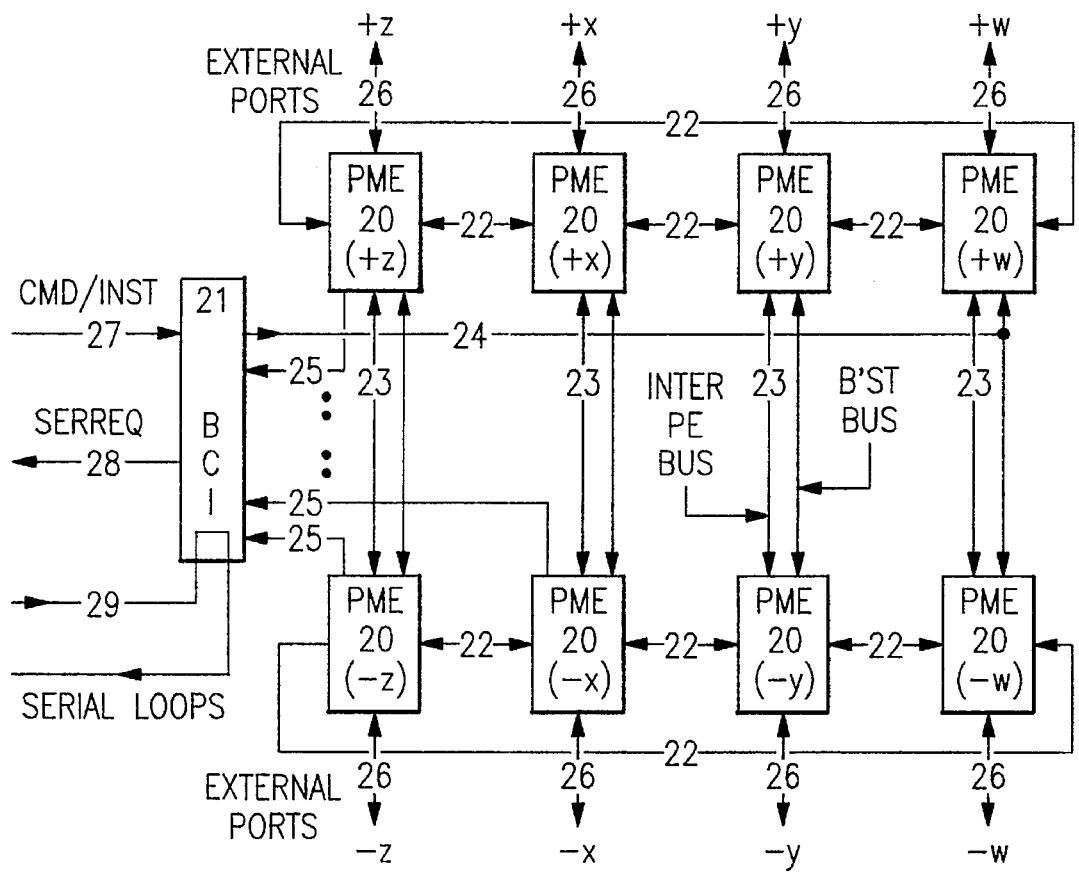
FIG. 8 is a schematic illustrative of the embodiment of the Processing Memory Element Node and particularly shows the interconnection of the various elements which make up the Node.

The cluster consists of a number of PMEs that are interconnected as a modified hypercube. In a hypercube, each cell can address as its neighbor any cell whose address differs in any single-bit position. In a ring any cell can address as its neighbor the two cells whose addresses differ ±1. The modified hypercubes utilized for the Hedgehog combines these approaches by building hypercubes out of rings. The intersection of rings is defined to be a node. The node, in our preferred embodiment shown in FIG. 8, comprises 2n PMEs 20 plus the Broadcast and Control Interface (BCI) 21 section. The PMEs are configured within the node as a 2 by n array where "n" represents the number of dimensions, or rings, which characterize the array and is limited by the physical chip package; for the preferred embodiment, n=4. As chip technology improves, increasing "n" will allow increased dimensionality in the array.

Figure 9A:
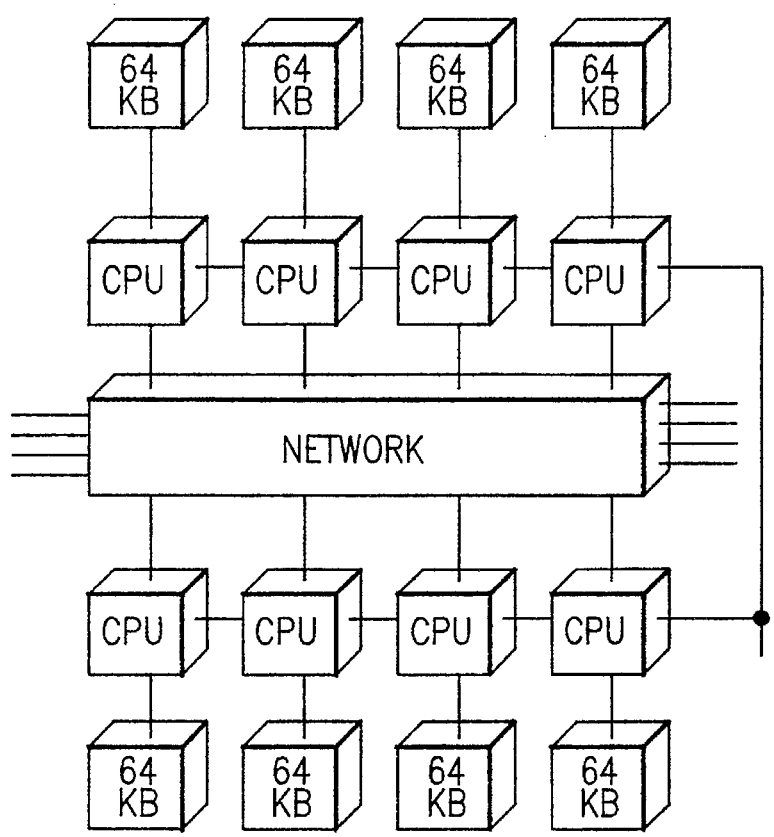
FIG. 9 is a schematic illustrative of the modified binary hypercube.
Figure 9B:
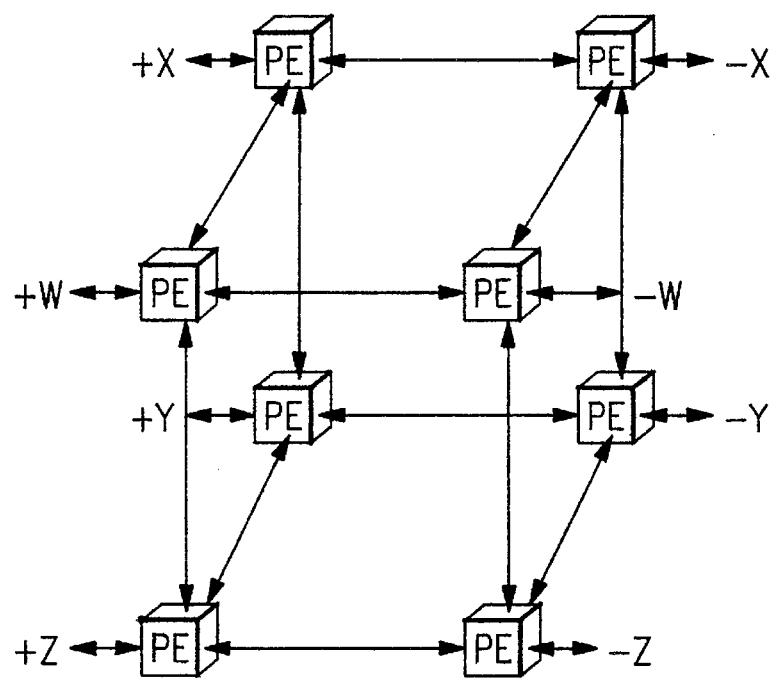

FIG. 9 shows the buildup from the PME to the array. Eight PMEs are interconnected to form a node 151. A group of eight nodes are interconnected in the X dimension rings (16 PMEs) and an overlapping group of eight nodes is interconnected in the Y dimension rings 152. This yields a single two dimensional cluster with an 8×8 array of nodes (512 PMEs). Clusters are combined in up to an 8×8 array to form a four dimensional array element 153. Every group of eight nodes across the array element is interconnected in both the W dimension and Z dimension. The interconnection paths for a single node in all four dimensions are shown 154. Note that it is not necessary that the array be either regular or orthogonal. Particular applications or configurations could redefine the number of nodes in any or all dimensions.

Each PME exists in only one ring of nodes 26 (FIG. 2). The rings are denoted W, X, Y, and Z. PMEs 20 within a chip are paired (i.e. +W,−W) such that one moves data externally clockwise along a ring of nodes, and the other moves data externally counterclockwise along the ring of nodes 23,26, thus dedicating a PME to each node external port. The two PMEs in each ring are designated by their external I/O port (+W, −W, +X, −X, +Y, −Y, +Z, −Z). Within the node, there are also two rings 22 which interconnect the 4+n and the 4−n PMEs. These internal rings provide the path for messages to move between the external rings. Since the APAP can be considered a four-dimensional orthogonal array 151–154, the internal rings allow messages to move through the array in all dimensions. This leads to the addressing structure where any PME can step messages toward the objective by addressing a PME in its own ring of nodes or an adjacent PME within its node.

Figure 10:
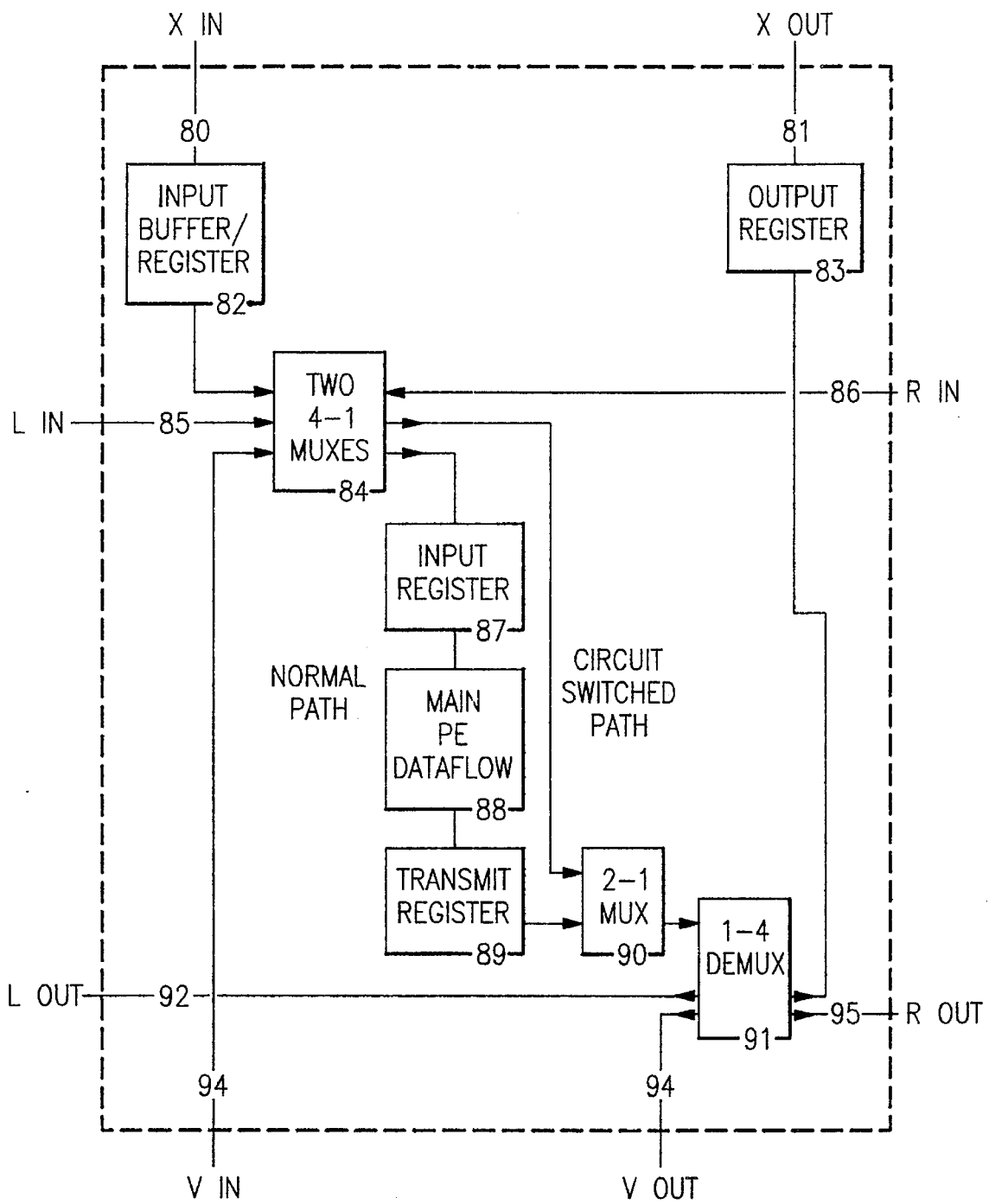
FIG. 10 is a schematic illustrative of the the circuit switch path.
Figure 20:
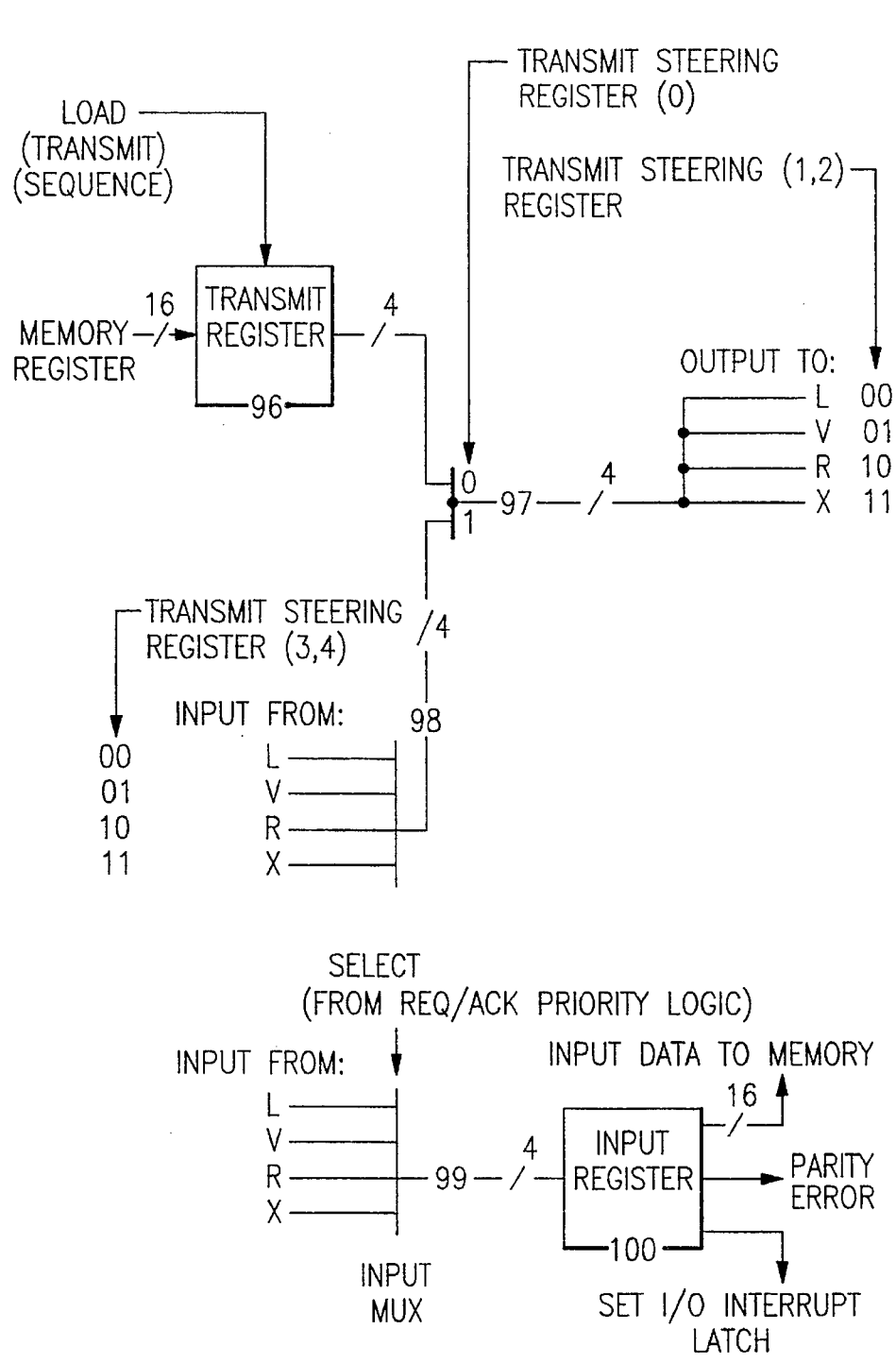
FIG. 20 is a schematic illustrative of the the PE I/O data flow.

Each PME has 4 input ports and 4 output ports (Left 85,92, Right 86,95, Vertical 93,94, and External 80,81) in FIG. 10. Three of the input ports and three of the output ports are full duplex point-to-point connections to other PMEs on the chip. The fourth port provides a full duplex point-to point connection to an off-chip PME. Due to pin and power constraints in the physical package of the preferred implementation, the actual I/O interfaces are 4-bit wide paths 97,98,99 which are used to multiplex four nibbles of the inter-PME data word 96,100, illustrated in FIG. 20.

In the preferred embodiment, the PME I/O design provides three I/O operating modes:

Normal Mode—Used to transfer data between two adjacent PMEs. Data transfer is initiated by the PME software. Data destined for a PME further than the adjacent PME must be received by the adjacent PME and then sent on as if it originated in the adjacent PME. Normal mode is shown in detail in the co-pending application entitled "PME Store and Forward/Circuit Switched Modes."

Circuit Switched Mode—Allows data and controls to pass through a PME. This allows fast communication between PMEs that are not immediate neighbors. Circuit switched mode is disclosed in detail in the co-pending application entitled "PME Store and Forward/ Circuit Switched Modes."

Zipper Mode—Used by the Array Controller to load or read data from the nodes in a cluster. Zipper mode uses features of the normal and circuit switched modes to rapidly transfer data into and out of the array of PMEs on a cluster card.

Figure 11:
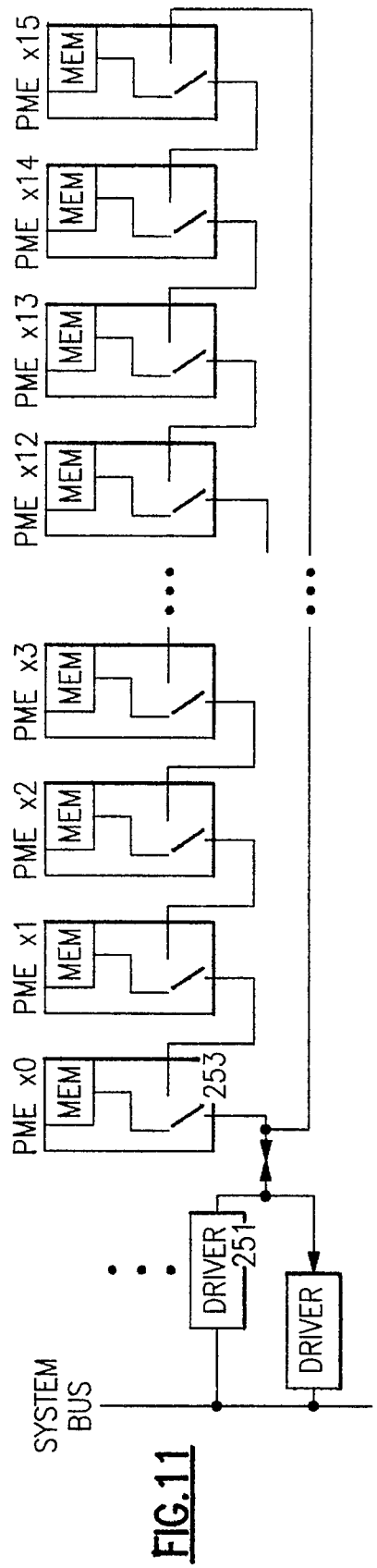
FIG. 11 is a schematic illustrative of a zipper connection on a single PME—PME interface.

Each ring within the array W, X, Y, Z is continuous; there is no "edge" to the array. Conceptually, the zipper is a logical breaking of a ring at the interface between two nodes to form a temporary edge. If the zipper is inactive, the array has no edge. When the zipper is activated, all the interfaces between two columns of nodes are broken and the resulting "edge" is used for data transfer between the array and the array controller. For example, refering to FIG. 11, if a zipper connection is placed on the −X interface along the X=0 row of nodes, the interface between the X=8 (PME×15) 250 row of nodes and the X=0 (PME×0) 253 row of nodes is no longer point-to-point but rather has a third (host) interface 251 attached. Normally, data passes between PME×0 253 and PME×15 250 as if the host interface were not there. However, under PME runtime software control, if the zipper is activated data is passed between the array 250,253 and the host 251 through the temporary edge of the array. A zipper along a row of a single cluster breaks the rings at eight nodes. Based on today's technology, the preferred embodiment can pass approximately 57 megabytes per second through a single zipper into/out of a single cluster. Future technology enhancements such as optical connections are expected to provide significant increases in this data rate.

Figure 12:
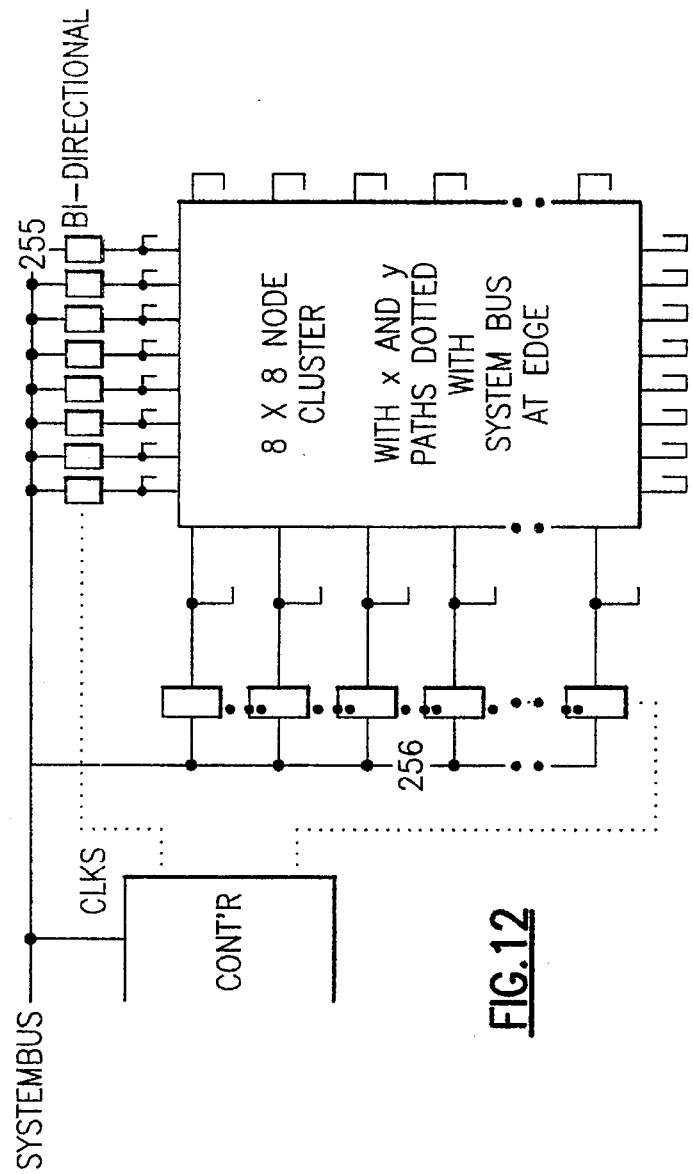
FIG. 12 is a schematic illustrative of a zipper connection on a two orthogonal connections to a Cluster.
Figure 17:
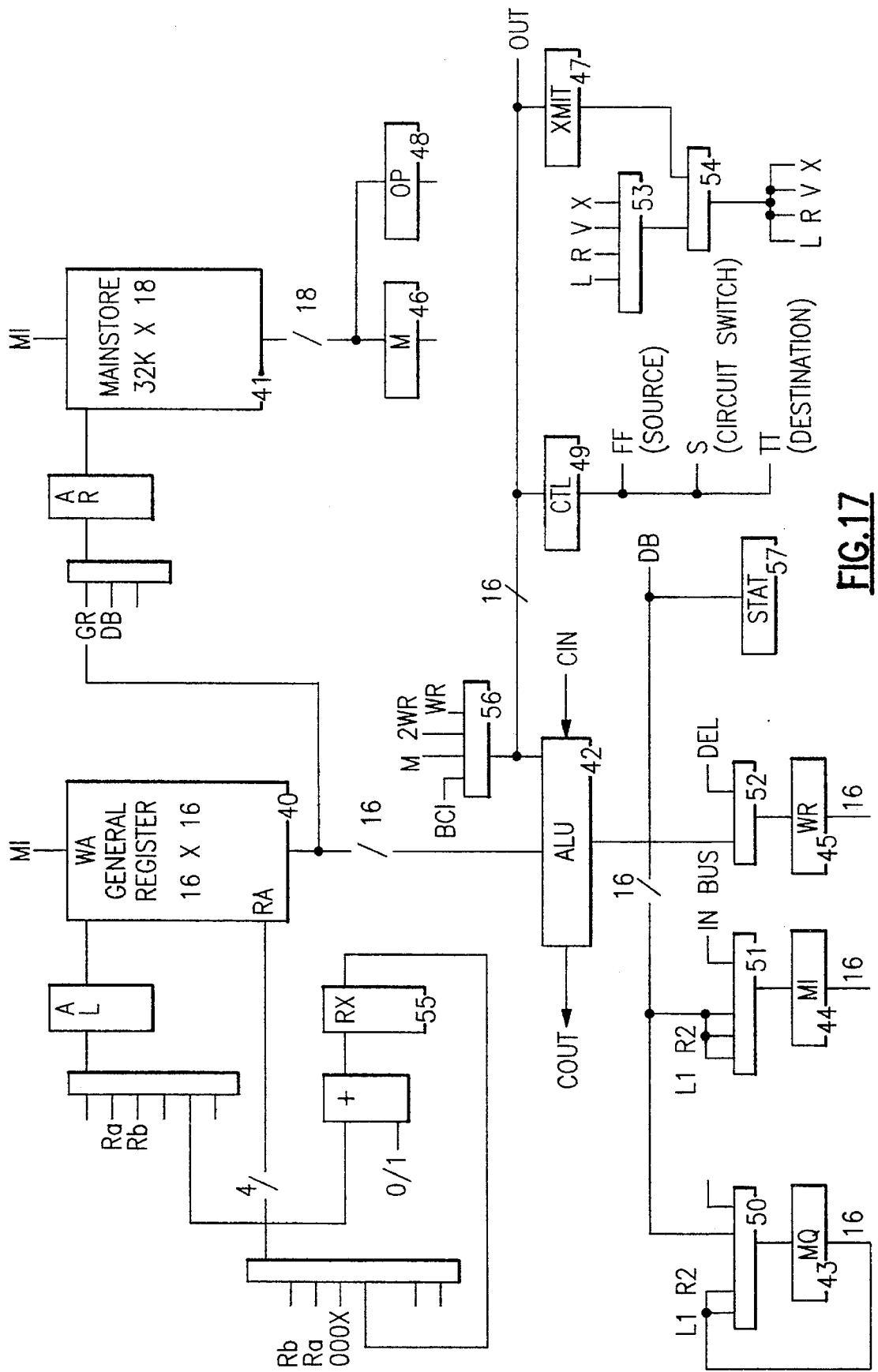
FIG. 17 is a data flow illustrative of the embodiment of the Processing Memory Element (PME). The principle sections of the data flow include mainstore, general regs, ALU and Regs, and a portion of the interconnect mesh.
Figure 18:
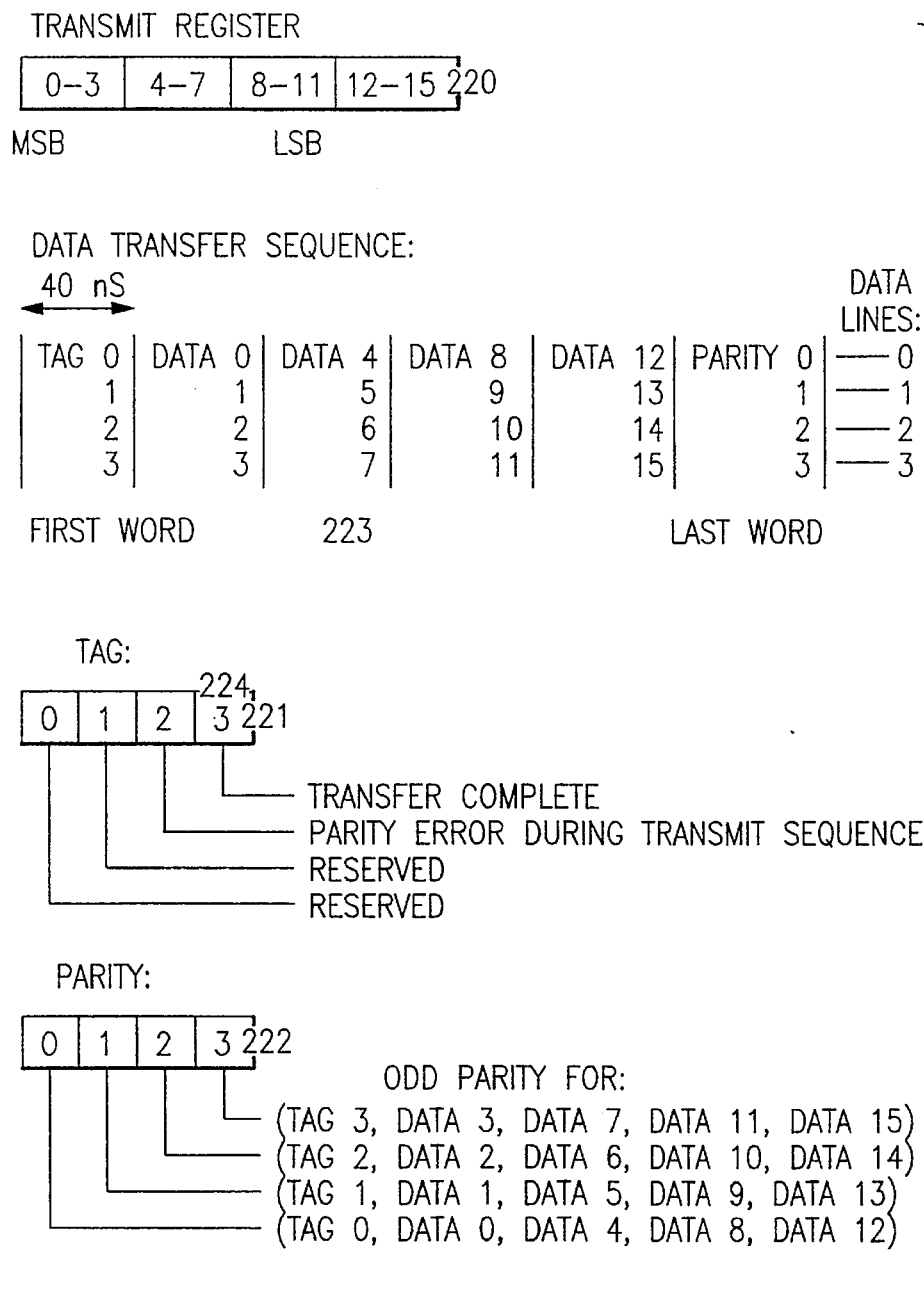
FIG. 18 is a schematic illustrative of the Tag, Parity, and Data words transferred between PME I/Os.

FIG. 12 shows how this concept might be expanded to put a zipper on two "edges" 255,256 of a cluster. This approach increases the I/O bandwidth to approximately 114 megabytes per second if different data is passed into each zipper, or supports approximately 57 megabytes per second of orthogonal data movement within the array if identical data is passed into each zipper. Orthogonal data movement supports fast transpose and matrix-multiply operations within the array. In theory, there could be a zipper on every inter-nodal interface. In practice, each PME with a zipper interface must be able to move array I/O data along to other PMEs to avoid filling its memory and being unable to accept more data. The number of zippers is limited by the technology which determines how much memory is available at each PME and the rate at which zipper data can be moved between the PMEs on the zipper and other PMEs within the array.

The preferred embodiment of the zipper has two modes of operation, zipper input and zipper output. A zipper input operation transfers data from the array controller to a selected group of PMEs on the cluster. Zipper input operation is initiated by the array controller runtime software. Array Controller runtime software first uses PME SIMD mode broadcast commands (see "SIMD/MIMD Processing Memory Element" referenced above) to put the PMEs along the zipper interface in one of two modes: Zipper Normal (ZN) or Zipper Circuit Switched (ZC). The array controller runtime software then provides the SIMD PME software in ZN mode with a count of words to receive. In ZN Mode, a PME can receive data from the X interface 80 (FIG. 10), but it must first set up an input buffer in memory for that interface. Two locations in memory are reserved to contain the starting address of each input data buffer 232 and the number of words contained in the buffer 233. In addition, PME CONTROL REGISTER 2 (FIG. 14) contains mask bits which both enable the input interfaces 173 and allow I/O interrupts 172. Broadcast SIMD PME software loads the reserved memory locations to define the output data block and loads PME CONTROL REGISTER 2 to enable input data transfers. In ZN mode, the PME idles and awaits an I/O interrrupt or toggle to ZC mode.

A zipper input operation for one possible configuration of PMEs is shown in FIG. 15, where an example of a transfer of 8 words to 3 different PMEs is shown. The data interface (zipper) transfers data to PME 260 and is moved from PME to PME thru the array.

In our preferred embodiment, the array controller initially sets PEA 260, B 261, and D 263 in ZN mode and PE C 262 in ZC mode. For a zipper input operation, setting the "Z" 163 and "CS" 170 bits in PME CONTROL REGISTER 1 places the PME in ZC mode. Setting the "Z" 163 bit and resetting the "CS" 170 bit places the PE in ZN mode. PE A, B, and D have initial receive counts of 3, 4, and 1 assigned. PEA receives its 3 data words using the normal receive sequence. When the word count goes to zero, hardware in PE A resets the "CS" 170 bit in PME CONTROL REGISTER 1, causing PE A 264 to go into ZC mode. The same sequence occurs in PE B 269 and D 271. On the last word transfer (to PE D) 271, the array controller can insert a Transfer Complete (TC) tag 224 bit. When the TC bit is set, PEs A–D will detect the bit and generate an I/O interrupt 171 request. If the TC 224 bit is not set, PEs A–D remain in ZC 272–275 mode at the end of the transfer.

When a Request 240 is detected on the zipper interface, the receiving PME sends out an Acknowledge 241 and loads the data into the Input Register 87. A receive sequence is then initiated which fetches and decrements the count 233, fetches and increments the input buffer address 232, and stores the data word in the PME memory 41. The receive sequence is analogous to the transmit sequence. It breaks into the PME idling to cycle-steal the access to memory 41 and the ALU 42 to update the I/O address and count fields and to lead the input data word into memory 41. This sequence continues until either the count reaches zero which switches the mode to ZC or a TC Tag is received which sets the corresponding input interrupt register bit 171 with an interrupt code 190 indicating "Transfer Complete."

A PME will generate an Acknowledge in response to a request if the following conditions are met:

The Input Register 87,100 is free,

Requests are not inhibited 174,

An interrupt 182 is not pending on that request input,

The Request input is not circuit switched, and

The Request has the highest priority of all current requests.

The Input Register 87,100 becomes busy from the time an Acknowledge 226 is generated until the receive sequence stores the data word in memory. When the input register is busy, Acknowledge is inhibited. The busy condition prevents the input register from being overwritten before a receive sequence occurs (since a receive sequence could be delayed for memory refresh).

If the TC tag bit 224 is sent from the transmitting zipper, an I/O interrupt latch is set 171 for that interface. No further Acknowledges 226 on that interface will be generated until the interrupt latch is reset by PME runtime software. For example, if the TC tag bit 224 is set on a data transfer from the X interface 82, further requests from X are inhibited until the L interrupt is taken and the L interrupt latch is reset.

If the data word is transferred with the TC tag 224 bit set and the receiving PME is in ZN mode, an I/O interrupt is generated 171 for the external interface, and the interrupt code 190 is set to reflect TC. In addition, should the buffer count go to zero before a TC tag is sent from the transmitting zipper, the PME toggles to ZC mode.

When a PME is in ZN receive mode, it can only execute memory refresh sequences and receive sequences for the zipper input. This is necessary since the zipper data transfer can occur at the maximum PME clock rate. No time can be allowed for PME instruction execution or receive sequences for the non-zipper inputs. While in ZN mode, the PE hardware inhibits all input requests except the zipper input request. A PME in ZC mode is capable of the full range of operations for a PME in circuit switched mode as explained in "PME Store and Forward/Circuit Switched Modes". This includes the ability to use splitter submode on zipper data.

A zipper output operation transfers data from a selected group of PMEs in a cluster to the array controller. Zipper output operation is initiated by the array controller runtime software which first uses SIMD mode broadcast commands to put the PMEs around the zipper interface in one of two modes, Zipper Normal or Zipper Circuit Switched. The array controller runtime software then provides the PME SIMD software in ZN mode with a count of words to send.

Conceptually, data is transferred from the originating PME's main memory to the CSE's buffer memory. In the preferred embodiment, for each interface two locations in memory are reserved to contain the starting address of the output data block 230 and the number of words contained in the block 231 . In addition, PME CONTROL REGISTER 1, see FIG. 14, controls the destination and mode of the data output. Broadcast SIMD PME software loads PME CONTROL REGISTER 1 to define transfer mode. Either Broadcast SIMD PME software or PME runtime software loads the designated memory locations with the data to be transferred to the host. Then Broadcast SIMD PME software loads the address and count into the designated memory locations. Next it loads the PME CONTROL REGISTER 1, and finally it executes an OUT instruction which initiates the data transmit sequence.

Figure 19:
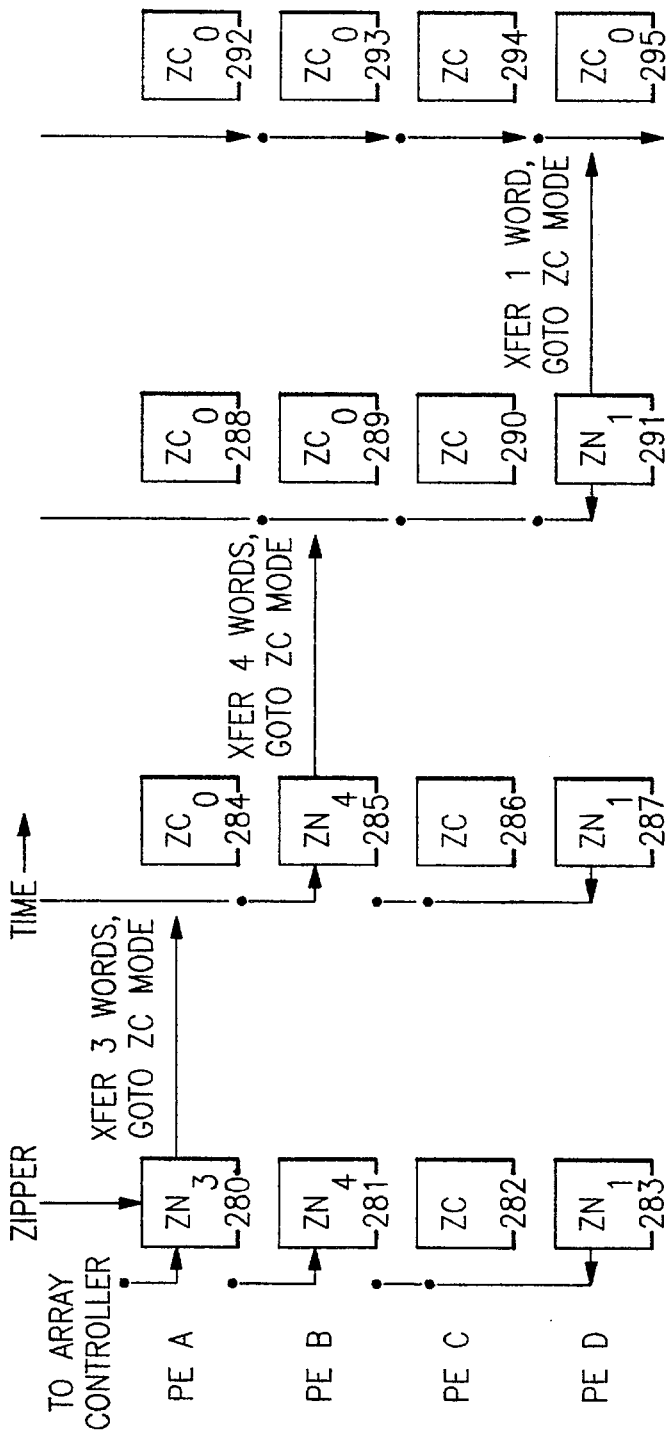
FIG. 19 is a schematic illustrative of the Zipper Transmit Sequence.

A zipper output operation for one possible configuration of PMEs is shown in FIG. 19, where an example of a transfer of 8 words to 3 different PMEs is shown. The data interface (zipper) transfers data from PME 280 and is moved from PME to PME thru the array.

In this example, the array controller initially sets PEA 280, B 281, and D 283 in ZN mode and PE C 282 in ZC mode. For a zipper output operation, setting the "Z" 163 and "CS" 170 bits in PME CONTROL REGISTER 1 places the PME in ZC mode. Setting the "Z" 163 bit and resetting the "CS" 170 bit places the PME in ZN mode. PE A, B, and D have counts of 3, 4, and 1 assigned. PME A sends its 3 data words using the normal transmit sequence. When the word count goes to zero, hardware in PME A resets the "CS" 170 bit in PME CONTROL REGISTER 1 causing PME A 284 to go into ZC mode. The same sequence occurs in PME B 289 and D 295. If PME D has PME CONTROL REGISTER "TC" 164 set, on the last word transfer (from PME D), PME D inserts a Transfer Complete (TC) tag 224 bit. If the TC tag is set, PMEs A–D will detect the bit and generate an I/O interrupt 171 request. If the TC tag is not set, PMEs A–D remain in ZC mode at the end of the transfer.

For each data word sent, the transmit sequence decrements the count 231, increments the starting address 230, and reads a data word from memory 41. The data word is loaded into the Transmit Register 47,96 and sent to the selected PME 97,161 interface. The transmit sequence breaks into the PME idling to cycle-steal the access to memory 41 and the ALU 42 to update the I/O address and count fields and to load the Transmit Register 47,96. For zipper transfers, the CX bit 165 in PME CONTROL REGISTER 1 is set so that the PME processor idles until the transmit sequence completes. This sequence continues until the count reaches zero.

The data transfer interface is four bits wide 97; thus, each 16-bit data word 220 is sent in four 4-bit pieces (nibbles). Also, a Tag nibble 221 and Parity nibble 222 are sent with the data. The transfer format is shown in 223. The transmit sequence is shown in FIG. 21. On the interface, the transmitting PME generates a Request 225 to the receiving zipper interface. When an Acknowledge 226 is received, the transmitting PME begins the data transfer, and another transmit sequence can occur. The next transmit sequence will not occur until an acknowledge has been received.

If the TC bit 164 is set in PME CONTROL REGISTER 1, the TC bit 224 will be set in the tag field of the last data word transferred. This bit lets the receiving zipper know that the data transfer has ended.

When a PME is in ZN transmit mode, it can only execute transmit and memory refresh sequences. This is necessary since the zipper data transfer can occur at the maximum PME clock rate. No time can be allowed for PME instruction execution or receive sequences for the non-zipper inputs. While in ZN transmit mode the PME hardware inhibits all input requests. A PME in ZC mode is capable of the full range of operations for a PME in circuit switched mode as in "PME Store and Forward/Circuit Swtiched Mode." This includes the ability to use splitter submode on zipper data.

Figure 22:
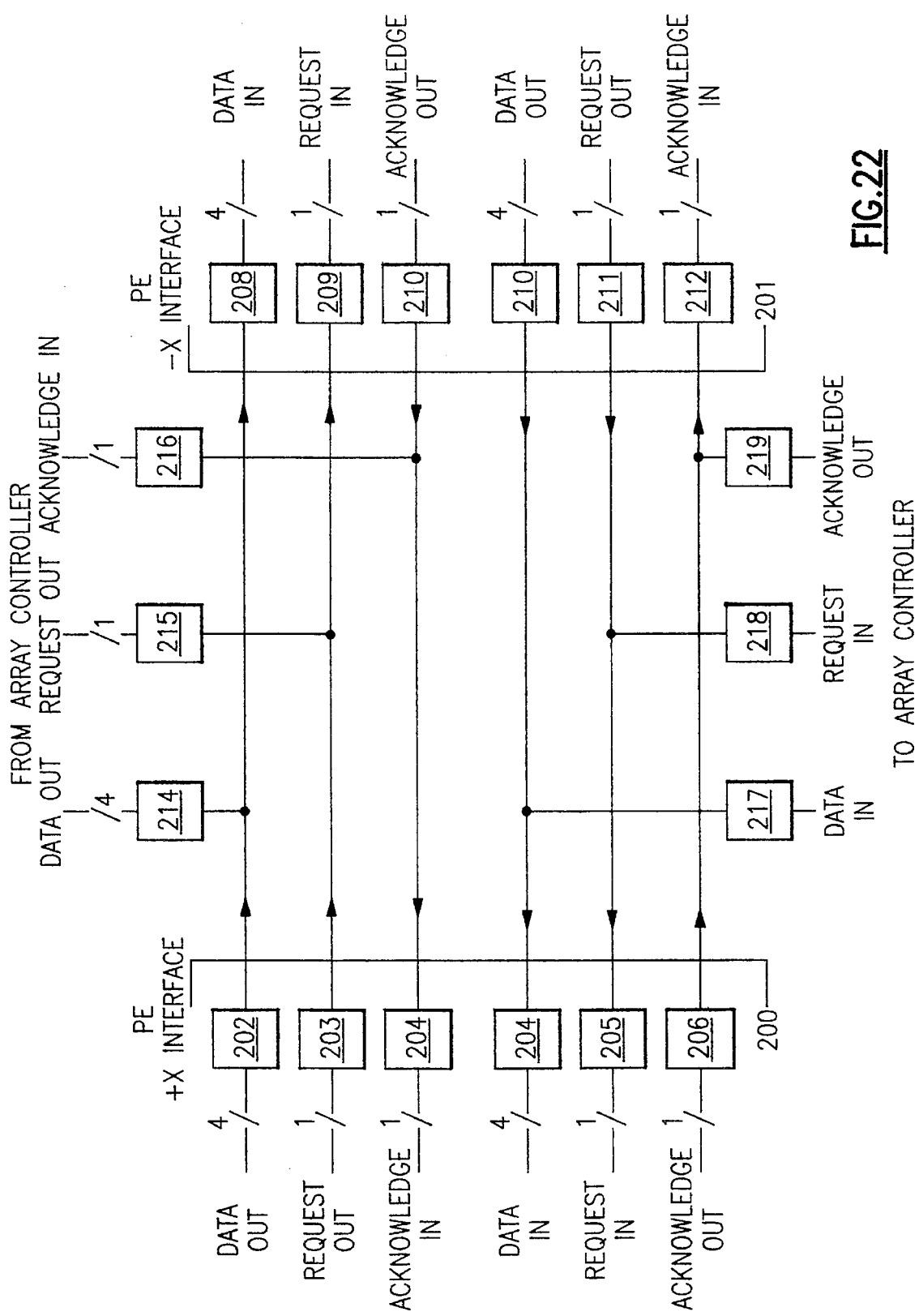
FIG. 22 is a schematic illustrative of the physical Zipper interface.

The zipper interface connects the array controller to node on the cluster as shown at the top and bottom of FIG. 22. The normal interface consists of two nibble (4-bit) uni-directional point-to-point interfaces which provide bidirectional full duplex transfers between the two PMEs. We prefer to employ the process described for the transfer of six nibbles from one PME to the other as in "PME Store and Forward/Circuit Switched Modes." Essentially, information is transferred from the PME on the left 200 using the data path 202, request line 203, and acknowledge line 204. Concurrently, information can be transferred from the PME on the right 201 using the data path 210, request line 211, and acknowledge line 212. When the zipper is installed on an interface, data path 214, request line 215, and Acknowledge path 216 are added to move data into the array, and data path 217, request line 218, and Acknowledge path 219 are added to move data out of the array. Array Controller runtime software causes PME 200 runtime software to disable 202, 203, and 204 when it wants to do a zipper transmit sequence to PME 201. Likewise, array controller runtime software causes PME 201 runtime software to disable 210, 211, and 212 when it wants to do a zipper receive sequence to PME 200. Note that the placement of the zipper logic is entirely arbitrary to the implementation. It could as easily be placed on the +X and −X interface of the same node or could be placed on any or all of the W, Y, or Z node interfaces.

System Architecture

An advantage of the system architecture which is employed in the current preferred embodiment is the ISA system which will be understood by many who will form a pool for programming the APAP. The PME ISA consists of the following Data and Instruction Formats illustrated in the Tables.

Data Formats

The basic (operand) size is the 16 bit word. In PME storage, operands are located on integral word boundaries. In addition to the word operand size, other operand sizes are available in multiples of 16 bits to support additional functions.

Within any of the operand lengths, the bit positions of the operand are consecutively numbered from left to right starting with the number 0. Reference to high-order or most-significant bits always refer to the left-most bit positions. Reference to the low-order or least-significant bits always refer to the right-most bit positions.

Instruction Formats

The length of an instruction format may either be 16 bits or 32 bits. In PME storage, instructions must be located on a 16 bit boundary.

The following general instruction formats are used. Normally, the first four bits of an instruction define the operation code and are referred to as the OP bits. In some cases, additional bits are required to extend the definition of the operation or to define unique conditions which apply to the instruction. These bits are referred to as OPX bits.

| Format Code | Operation |
|---|---|
| RR | Register to Register |
| DA | Direct Address |
| RS | Register Storage |
| RI | Register Immediate |
| SS | Storage to Storage |
| SPC | Special |

All formats have one field in common. This field and its interpretation is:
Bits 0–3

Operation Code—This field, sometimes in conjunction with an operation code extension field, defines the operation to be performed.

Detailed figures of the individual formats along with interpretations of their fields are provided in the following subsections. For some instructions, two formats may be combined to form variations on the instruction. These primarily involve the addressing mode for the instruction. As an example a storage to storage instruction may have a form which involves direct addressing or register addressing.

RR Format

The Register—Register (RR) format provides two general register addresses and is 16 bits in length as shown.

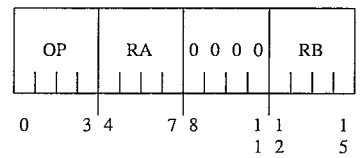

In addition to an Operation Code field, the RR format contains:
Bits 4–7

Register Address 1—The RA field is used to specify which of the 16 general registers is to be used as an operand and/or destination.
Bits 8–11

Zeros—Bit 8 being a zero defines the format to be a RR or DA format and bits 9–11 equal to zero define the operation to be a register to register operation (a special case of the Direct Address format).
Bits 12–15

Register Address 2—The RB field is used to specify which of the 16 general registers is to be used as an operand.

DA Format

The Direct Address (DA) format provides one general register address and one direct storage address as shown.

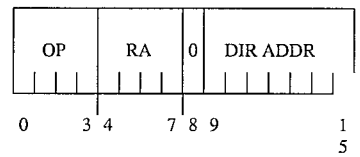

In addition to an Operation Code field, the DA format contains:
Bits 4–7

Register Address 1—The RA field is used to specify which of the 16 general registers is to be used as an operand and/or destination.
Bit 8

Zero—This bit being zero defines the operation to be a direct address operation or a register to register operation.
Bits 9–15

Direct Storage Address—The Direct Storage Address field is used as an address into the level unique storage block or the common storage block. Bits 9–11 of the direct address field must be non-zero to define the direct address form.

RS Format

The Register Storage (RS) format provides one general register addresses and an indirect storage address.

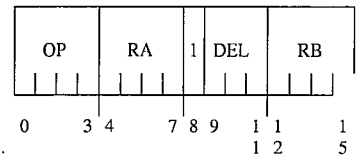

In addition to an Operation Code field, the RS format contains:

Bits 4–7

Register Address 1—The RA field is used to specify which of the 16 general registers is to be used as an operand and/or destination.

Bit 8

One—This bit being one defines the operation to be a register storage operation.

Bits 9–11

Register Data—These bits are considered a signed value which is used to modify the contents of register specified by the RB field.

Bits 12–15

Register Address 2—The RB field is used to specify which of the 16 general registers is to be used as an storage address for an operand.

RI Format

The Register-Immediate (RI) format provides one general register address and 16 bits of immediate data. The RI format is 32 bits of length as shown:

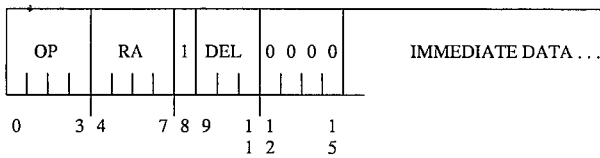

In addition to an Operation Code field, the RI format contains:

Bits 4–7

Register Address 1—The RA field is used to specify which of the 16 general registers is to be used as an operand and/or destination.

Bit 8

One—This bit being one defines the operation to be a register storage operation.

Bits 9–11

Register Data—These bits are considered a signed value which is used to modify the contents of the program counter. Normally, this field would have a value of one for the register immediate format.

Bits 12–15

Zeroes—The field being zero is used to specify that the updated program counter, which points to the immediate data field, is to be used as an storage address for an operand.

Bits 16–31

Immediate Data—This field serves as a 16 bit immediate data operand for Register Immediate instructions.

SS Format

The Storage to Storage (SS) format provides two storage addresses, one explicit; and the second implicit. The implied storage address is contained in General Register 1. Register 1 is modified during execution of the instruction. There are two forms of a SS instruction, a direct address form and a storage address form.

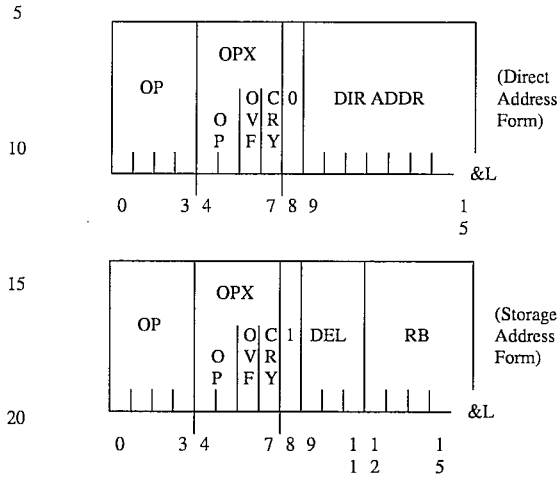

In addition to an Operation Code field, the SS format contains:

Bits 4–7

Operation Extension Code—The OPX field, together with the Operation Code, defines the operation to be performed. Bits 4–5 define the operation type such as ADD or SUBTRACT. Bits 6–7 control the carry, overflow, and how the condition code will be set. Bit 6=0 ignores overflow, bit 6=1 allows overflow. Bit 7=0 ignore the carry stat during the operation; bit 7=1 includes the carry stat during the operation.

Bit 8

Zero—Defines the form to be a direct address form.

One—Defines the form to be a storage address form.

Bits 9–15

Direct Address (Direct Address Form)—The Direct Storage Address field is used as an address into the level unique storage block or the common storage block. Bits 9–11 of the direct address field must be non-zero to define the direct address form.

Bits 9–11

Register Delta (Storage Address Form)—These bits are considered a signed value which is used to modify the contents of register specified by the RB field.

Bits 12–15

Register Address 2 (Storage Address Form)—The RB field is used to specify which of the 16 general registers is to be used as a storage address for an operand.

SPC Format 1

The Special (SPC1) format provides one general register storage operand address.

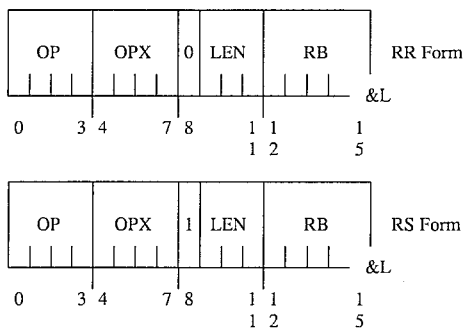

In addition to an Operation Code field, the SPC1 format contains:

Bits 4–7

OP Extension—The OPX field is used to extend the operation code.

Bit 8

Zero or One—This bit being zero defines the operation to be a register operation. This bit being one defines the operation to be a register storage operation.

Bits 9–11

Operation Length—These bits are considered an unsigned value which is used to specify the length of the operand in 16 bit words. A value of zero corresponds to a length of one, and a value of B'111' corresponds to a length of eight.

Bits 12–15

Register Address 2—The RB field is used to specify which of the 16 general registers is to be used as a storage address for the operand.

SPC Format 2

The Special (SPC2) format provides one general register storage operand address.

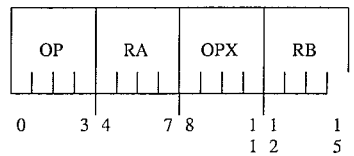

In addition to an Operation Code field, the SPC2 format contains:

Bits 4–7

Register Address 1—The RA field is used to specify which of the 16 general registers is to be used as an operand and/or destination.

Bits 8–11

OP Extension—The OPX field is used to extend the operation code.

Bits 12–15

Register Address 2—The RB field is used to specify which of the 16 general registers is to be used as a storage address for the operand.

THE INSTRUCTION LIST OF THE ISA INCLUDES THE FOLLOWING:

TABLE 1

| Fixed-Point Arithmetic Instructions | | |
|---|---|---|
| NAME | MNEMONIC | TYPME |
| ADD DIRECT | ada | DA |
| ADD FROM STORAGE | a | RS |
| (WITH DELTA) | awd | RS |
| ADD IMMEDIATE | ai | RI |
| (WITH DELTA) | aiwd | RI |
| ADD REGISTER | ar | RR |
| COMPARE DIRECT ADDRESS | cda | DA |
| COMPARE IMMEDIATE | ci | RI |
| (WITH DELTA) | ciwd | RI |
| COMPARE FROM STORAGE | c | RS |
| (WITH DELTA) | cwd | RS |
| COMPARE REGISTER | cr | RR |
| COPY | cpy | RS |
| (WITH DELTA) | cpywd | RS |
| COPY WITH BOTH IMMEDIATE | cpybi | RI |
| (WITH DELTA) | cpybiwd | RI |
| COPY IMMEDIATE | cpyi | RI |
| (WITH DELTA) | cpyiwd | RI |
| COPY DIRECT | cpyda | DA |
| COPY DIRECT IMMEDIATE | cpydai | DA |
| INCREMENT | inc | RS |
| (WITH DELTA) | incwd | RS |
| LOAD DIRECT | lda | DA |
| LOAD FROM STORAGE | l | RS |
| (WITH DELTA) | lwd | RS |
| LOAD IMMEDIATE | li | RI |
| (WITH DELTA) | liwd | RI |
| LOAD REGISTER | lr | RR |
| MULTIPLY SIGNED | mpy | SPC |
| MULTIPLY SIGNED EXTENDED | mpyx | SPC |
| MULTIPLY SIGNED EXTENDED IMMEDIATE | mpyxi | SPC |
| MULTIPLY SIGNED IMMEDIATE | mpyi | SPC |
| MULTIPLY UNSIGNED | mpyu | SPC |
| MULTIPLY UNSIGNED EXTENDED | mpyux | SPC |

TABLE 1-continued

Fixed-Point Arithmetic Instructions

| NAME | MNEMONIC | TYPME |
|---|---|---|
| MULTIPLY UNSIGNED EXTENDED IMMEDIATE | mpyuxi | SPC |
| MULTIPLY UNSIGNED IMMEDIATE | mpyui | SPC |
| STORE DIRECT | stda | DA |
| STORE | st | RS |
| (WITH DELTA) | stwd | RS |
| STORE IMMEDIATE | sti | RI |
| (WITH DELTA) | stiwd | RI |
| SUBTRACT DIRECT | sda | DA |
| SUBTRACT FROM STORAGE | s | RS |
| (WITH DELTA) | swd | RS |
| SUBTRACT IMMEDIATE | si | RI |
| (WITH DELTA) | siwd | RI |
| SUBTRACT REGISTER | sr | RR |
| SWAP AND EXCLUSIVE OR WITH STORAGE | swapx | RR |

TABLE 2

Storage to Storage Instructions

| NAME | MNEMONIC | TYPME |
|---|---|---|
| ADD STORAGE TO STORAGE | sa | SS |
| (WITH DELTA) | sawd | SS |
| ADD STORAGE TO STORAGE DIRECT | sada | SS |
| ADD STORAGE TO STORAGE FINAL | saf | SS |
| (WITH DELTA) | safwd | SS |
| ADD STORAGE TO STORAGE FINAL DIRECT | safda | SS |
| ADD STORAGE TO STORAGE INTERMEDIATE | sai | SS |
| (WITH DELTA) | saiwd | SS |
| ADD STORAGE TO STORAGE INTERMEDIATE DIRECT | saida | SS |
| ADD STORAGE TO STORAGE LOGICAL | sal | SS |
| (WITH DELTA) | salwd | SS |
| ADD STORAGE TO STORAGE LOGICAL DIRECT | salda | SS |
| COMPARE STORAGE TO STORAGE | sc | SS |
| (WITH DELTA) | scwd | SS |
| COMPARE STORAGE TO STORAGE DIRECT | scda | SS |
| COMPARE STORAGE TO STORAGE FINAL | scf | SS |
| (WITH DELTA) | scfwd | SS |
| COMPARE STORAGE TO STORAGE FINAL DIRECT | scfda | SS |
| COMPARE STORAGE TO STORAGE INTERMEDIATE | sci | SS |
| (WITH DELTA) | sciwd | SS |
| COMPARE STORAGE TO STORAGE INTERMEDIATE DIRECT | scida | SS |
| COMPARE STORAGE TO STORAGE LOGICAL | sci | SS |
| (WITH DELTA) | sclwd | SS |
| COMPARE STORAGE TO STORAGE LOGICAL DIRECT | sclda | SS |
| MOVE STORAGE TO STORAGE | smov | SS |
| (WITH DELTA) | smovwd | SS |
| MOVE STORAGE TO STORAGE DIRECT | smovda | SS |
| SUBTRACT STORAGE TO STORAGE | ss | SS |
| (WITH DELTA) | sswd | SS |
| SUBTRACT STORAGE TO STORAGE DIRECT | ssda | SS |
| SUBTRACT STORAGE TO STORAGE FINAL | ssf | SS |
| (WITH DELTA) | ssfwd | SS |
| SUBTRACT STORAGE TO STORAGE FINAL DIRECT | ssfda | SS |
| SUBTRACT STORAGE TO STORAGE INTERMEDIATE | ssi | SS |
| (WITH DELTA) | ssiwd | SS |
| SUBTRACT STORAGE TO STORAGE INTERMEDIATE DIRECT | saida | SS |
| SUBTRACT STORAGE TO STORAGE LOGICAL | ssl | SS |
| (WITH DELTA) | sslwd | SS |
| SUBTRACT STORAGE TO STORAGE LOGICAL DIRECT | sslda | SS |

TABLE 3

Logical Instructions

| NAME | MNEMONIC | TYPME |
| --- | --- | --- |
| AND DIRECT ADDRESS | nda | DA |
| AND FROM STORAGE | n | RS |
| (WITH DELTA) | nwd | RS |
| AND IMMEDIATE | ni | RI |
| (WITH DELTA) | niwd | Ri |
| AND REGISTER | nr | RR |
| OR DIRECT ADDRESS | oda | DA |
| OR FROM STORAGE | o | RS |
| (WITH DELTA) | owd | RS |
| OR IMMEDIATE | oi | RI |
| (WITH DELTA) | oiwd | RI |
| OR REGISTER | or | RR |
| XOR DIRECT ADDRESS | xda | DA |
| XOR FROM STORAGE | x | RS |
| (WITH DELTA) | xwd | RS |
| XOR IMMEDIATE | xi | RI |
| (WITH DELTA) | xiwd | RI |
| XOR REGISTER | xr | RR |

TABLE 4

Shift Instructions

| NAME | MNEMONIC | TYPME |
| --- | --- | --- |
| SCALE BINARY | scale | SPC |
| SCALE BINARY IMMEDIATE | scalei | SPC |
| SCALE BINARY REGISTER | scaler | SPC |
| SCALE HEXADECIMAL | scaleh | SPC |
| SCALE HEXADECIMAL IMMEDIATE | scalehi | SPC |
| SCALE HEXADECIMAL REGISTER | scalehr | SPC |
| SHIFT LEFT ARITHMETIC BINARY | sla | SPC |
| SHIFT LEFT ARITHMETIC BINARY IMMEDIATE | slai | SPC |
| SHIFT LEFT ARITHMETIC BINARY REGISTER | slar | SPC |
| SHIFT LEFT ARITHMETIC HEXADECIMAL | slah | SPC |
| SHIFT LEFT ARITHMETIC HEXADECIMAL IMMEDIATE | slahi | SPC |
| SHIFT LEFT ARITHMETIC HEXADECIMAL REGISTER | slahr | SPC |
| SHIFT LEFT LOGICAL BINARY | sll | SPC |
| SHIFT LEFT LOGICAL BINARY IMMEDIATE | slli | SPC |
| SHIFT LEFT LOGICAL BINARY REGISTER | sllr | SPC |
| SHIFT LEFT LOGICAL HEXADECIMAL | sllh | SPC |
| SHIFT LEFT LOGICAL HEXADECIMAL IMMEDIATE | sllhi | SPC |
| SHIFT LEFT LOGICAL HEXADECIMAL REGISTER | sllhr | SPC |
| SHIFT RIGHT ARITHMETIC BINARY | sra | SPC |
| SHIFT RIGHT ARITHMETIC BINARY IMMEDIATE | srai | SPC |
| SHIFT RIGHT ARITHMETIC BINARY REGISTER | srar | SPC |
| SHIFT RIGHT ARITHMETIC HEXADECIMAL | srah | SPC |
| SHIFT RIGHT ARITHMETIC HEXADECIMAL IMMEDIATE | srahi | SPC |
| SHIFT RIGHT ARITHMETIC HEXADECIMAL REGISTER | srahr | SPC |
| SHIFT RIGHT LOGICAL BINARY | sri | SPC |
| SHIFT RIGHT LOGICAL BINARY IMMEDIATE | srli | SPC |
| SHIFT RIGHT LOGICAL BINARY REGISTER | srlr | SPC |
| SHIFT RIGHT LOGICAL HEXADECIMAL | srih | SPC |
| SHIFT RIGHT LOGICAL HEXADECIMAL IMMEDIATE | srlhi | SPC |
| SHIFT RIGHT LOGICAL HEXADECIMAL REGISTER | srlhr | SPC |

TABLE 5

Branch Instructions

| NAME | MNEMONIC | TYPME |
| --- | --- | --- |
| BRANCH | b | RS |
| (WITH DELTA) | bwd | RS |
| BRANCH DIRECT | bda | DA |
| BRANCH IMMEDIATE | bi | RI |
| (WITH DELTA) | biwd | RI |
| BRANCH REGISTER | br | RS |
| BRANCH AND LINK | bal | RS |
| BRANCH AND LINK DIRECT | balda | DA |
| BRANCH AND LINK IMMEDIATE | bali | RI |
| (WITH DELTA) | baliwd | RI |
| BRANCH AND LINK REGISTER | balr | RS |
| BRANCH BACKWARD | bb | RS |
| (WITH DELTA) | bbwd | RS |
| BRANCH BACKWARD DIRECT | bbda | DA |
| BRANCH BACKWARD IMMEDIATE | bbi | RI |
| (WITH DELTA) | bbiwd | RI |
| BRANCH BACKWARD REGISTER | bbr | RS |
| BRANCH FORWARD | bf | RS |
| (WITH DELTA) | bfwd | RS |
| BRANCH FORWARD DIRECT | bfda | DA |
| BRANCH FORWARD IMMEDIATE | bfi | RI |
| (WITH DELTA) | bfiwd | RI |
| BRANCH FORWARD REGISTER | bfr | RS |
| BRANCH ON CONDITION | bc | RS |
| (WITH DELTA) | bcwd | RS |
| BRANCH ON CONDITION DIRECT | bcda | RS |
| BRANCH ON CONDITION IMMEDIATE | bci | RI |
| (WITH DELTA) | bciwd | RI |
| BRANCH ON CONDITION REGISTER | bcr | RS |
| BRANCH RELATIVE | brel | RI |

TABLE 5-continued

Branch Instructions

| NAME | MNE-MONIC | TYPME |
|---|---|---|
| (WITH DELTA) | brelwd | RS |
| NULL OPMERATION | noop | RR |

TABLE 6

Status Switching Instructions

| NAME | MNEMONIC | TYPME |
|---|---|---|
| RETURN | ret | SPC |

TABLE 7

Input/Output Instructions

| NAME | MNEMONIC | TYPME |
|---|---|---|
| IN | IN | SPC |
| OUT | OUT | SPC |
| INTERNAL DIOR/DIOW | INTR | SPC |

While we have described our preferred embodiments of our invention, it will be understood that those skilled in the art, both now and in the future, may make make various improvements and enhancements which fall within the scope of the claims which follow, These claims should be construed to maintain the proper protection for the invention first disclosed.

What is claimed is:

1. A computing system device, comprising:

a plurality of functional units each having a ALU and a memory connected to said ALU and a communication interface, a plurality of nodes interconnected in a network of nodes, each node including at least one of said plurality of functional units, to which a variety of computer system elements including computers and direct access storage devices are coupled, wherein the memory of said plurality of functional units provides a multi-ported intelligent shared memory switch for switch coupling said variety of computer system elements, at least one of said plurality of nodes being adjacent to a zipper, whereby said plurality of functional units in aggregate provide a finite computer memory and a processing unit which combines characteristics of a switch with characteristics of a shared memory and processor, wherein objects in the shared memory change state without intervention of any of said variety of computer system elements that are coupled to said plurality of funtional units, wherein each of said plurality of nodes of the multi-ported intelligent shared memory switch include a functional unit on a chip along with a switching means as a hedgehog processor memory element, and wherein the hedgehog processor memory element resolves contention and coherency issues that arise for said variety of computing system elements which share the hedgehog processor memory element in a communication network.

2. A computing system device, comprising:

a plurality of functional units each having a ALU and a memory connected to said ALU and a communication interface, a plurality of nodes interconnected in a network of nodes, each node including at least one of said plurality of functional units, to which a variety of computer system elements including computers and direct access storage devices are coupled, wherein the memory of said plurality of functional units provides a multi-ported intelligent shared memory switch for switch coupling said variety of computer system elements, at least one of said plurality of nodes being adjacent to a zipper, whereby said plurality of functional units in aggregate provide a finite computer memory and a processing unit which combines characteristics of a switch with characteristics of a shared memory and processor, wherein objects in the shared memory change state without intervention of any of said variety of computer system elements that are coupled to said plurality of funtional units, wherein each of said plurality of nodes of the multi-ported intelligent shared memory switch include a functional unit on a chip along with a switching means as a hedgehog processor memory element, and wherein said plurality of functional units provides transparent data transport.

3. A computing system device according to claim 2 wherein data are sourced at a zipper by a computer system element attached to that zipper and the data are switched to any other zipper and thus to a computer system element attached to that zipper such that switching is accomplished under the control of the functional units within the shared memory and there is high variability for switching, permitting, but not requiring, the use of packet headers in the communication across said plurality of functional units.

4. A computing system device, comprising:

a plurality of functional units each having a ALU and a memory connected to said ALU and a communication interface, a plurality of nodes interconnected in a network of nodes, each node including at least one of said plurality of functional units, to which a variety of computer system elements including computers and direct access storage devices are coupled, wherein the memory of said plurality of functional units provides a multi-ported intelligent shared memory switch for switch coupling said variety of computer system elements, at least one of said plurality of nodes being adjacent to a zipper, whereby said plurality of functional units in aggregate provide a finite computer memory and a processing unit which combines characteristics of a switch with characteristics of a shared memory and processor, wherein objects in the shared memory change state without intervention of any of said variety of computer system elements that are coupled to said plurality of funtional units, wherein each of said plurality of nodes of the multi-ported intelligent shared memory switch include a functional unit on a chip along with a switching means as a hedgehog processor memory element, and wherein said plurality of funtional units provides a data re-organization mode.

5. A computing system device according to claim 4 wherein data in the data re-organization mode is moved over the network one computing system element to another and during the movement of data, the data is able to be reorganized.

6. A computing system device according to claim 4 wherein data operations in the data reorganization mode include the rows and columns of a matrix being interchanged, a list of elements being sorted, or elements being reorganized in any other arbitrary way.

7. A computing system device, comprising:

a plurality of functional units each having a ALU and a memory connected to said ALU and a communication interface, a plurality of nodes interconnected in a network of nodes, each node including at least one of said plurality of functional units, to which a variety of computer system elements including computers and direct access storage devices are coupled, wherein the memory of said plurality of functional units provides a multi-ported intelligent shared memory switch for switch coupling said variety of computer system elements, at least one of said plurality of nodes being adjacent to a zipper, whereby said plurality of functional units in aggregate provide a finite computer memory and a processing unit which combines characteristics of a switch with characteristics of a shared memory and processor, wherein objects in the shared memory change state without intervention of any of said variety of computer system elements that are coupled to said plurality of funtional units, wherein each of said plurality of nodes of the multi-ported intelligent shared memory switch include a functional unit on a chip along with a switching means as a hedgehog processor memory element, and wherein a data modification mode for said plurality of funtional units is provided.

8. A computing system device according to claim 7 wherein data in the data modification mode is modified as said data is moved between computing system elements.

9. A computing system device according to claim 8 wherein in data operations in the data modification mode include the elements of a matrix being multiplied by a scalar and being transformed by any arbitrary function.

10. A computing system device, comprising:

a plurality of functional units each having a ALU and a memory connected to said ALU and a communication interface, a plurality of nodes interconnected in a network of nodes, each node having one or more functional units, to which a variety of computer system elements including computers and direct access storage devices are coupled, wherein the memory of said plurality of functional units provides a multi-ported intelligent shared memory switch that can be used to switch couple said variety of computer system elements, at least one of said plurality of the nodes being adjacent to a zipper, whereby said plurality of functional units in aggregate provide a finite computer memory and a processing unit which combines characteristics of a switch with characteristics of a shared memory and processor, wherein objects in the shared memory can change state without intervention of any of said variety of computer system elements that are coupled to said plurality of functional units, wherein each of the plurality of nodes of the multi-ported intelligent shared memory switch include a functional unit on a chip along with a switching means as a hedgehog processor memory element, and wherein a transparent data sharing mode is provided whereby data objects are shared by said variety of computing system elements attached to said plurality of functional units, and protocols for maintaining desired levels of data coherence can be implemented within the shared memory and do not have to be processed outside a hedgehog processor memory element.

11. A computing system device according to claim 10 wherein in a data reorganization mode, data sharing can be combined with reorganization and data on the node chip undergoes reorganization without the intervention of the sharing computer system elements, and connected computer system elements initiate reorganizations by sending messages to hedgehog objects, while computer system elements are prevented from viewing intermediate states without knowledge of the protocols required to prevent viewing of intermediate states by implementing the protocols within the hedgehog processor memory element.

12. A computing system device according to claim 11 wherein, the network provides data sharing with modification, and data residing in the hedgehog undergo reorganization without intervention of computer system elements, and connected computer system elements initiate modifications by sending messages to hedgehog objects, and computer system elements are prevented from viewing intermediate states without knowledge of the protocols required to prevent viewing of intermediate states by implementing the protocols within the memory.

13. A computing system device according to claim 12 wherein integrity measures are implemented within the hedgehog by associating hedgehog objects with secure tokens, known only to hedgehog processors, and only processors bound to those tokens will then have access to the objects, and such integrity measures do not require the use of processing resources outside of the hedgehog.

14. A computing system device according to claim 13 wherein hedgehog objects, without the use of outside processing resources, send messages to each other which then initiate state transitions of those objects whereby the computing system device becomes a shared computational resource.

15. A computing system device, comprising:

a plurality of functional units each having a ALU and a memory connected to said ALU and a communication interface, a plurality of nodes interconnected in a network of nodes, each node including at least one of said plurality of functional units, to which a variety of computer system elements including computers and direct access storage devices are coupled, wherein the memory of said plurality of functional units provides a multi-ported intelligent shared memory switch for switch coupling said variety of computer system elements, at least one of said plurality of nodes being adjacent to a zipper, whereby said plurality of functional units in aggregate provide a finite computer memory and a processing unit which combines characteristics of a switch with characteristics of a shared memory and processor, wherein objects in the shared memory change state without intervention of any of said variety of computer system elements that are coupled to said plurality of funtional units, wherein each of said plurality of nodes of the multi-ported intelligent shared memory switch include a functional unit on a chip along with a switching means as a hedgehog processor memory element, and wherein within the shared memory of the computing system device memory latency which is seen by all connected computers is made uniform to shared objects.

16. A computer system device according claim 15 wherein within the shared memory of the computing system device data format conversion is performed by the memory of the hedgehog itself.

* * * * *